(12) United States Patent
Peng et al.

(10) Patent No.: US 12,299,372 B2
(45) Date of Patent: May 13, 2025

(54) MIXED POLY PITCH DESIGN SOLUTION FOR POWER TRIM

(71) Applicant: Taiwan Semiconductor Manufacturing Company Limited, Hsinchu (TW)

(72) Inventors: Shih-Wei Peng, Hsinchu (TW); Lipen Yuan, Hsinchu County (TW); Jiann-Tyng Tzeng, Hsinchu (TW); Wei-Cheng Lin, Taichung (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

(21) Appl. No.: 18/361,948

(22) Filed: Jul. 31, 2023

(65) Prior Publication Data

US 2023/0385509 A1    Nov. 30, 2023

Related U.S. Application Data

(63) Continuation of application No. 16/925,483, filed on Jul. 10, 2020, now Pat. No. 11,755,808.

(51) Int. Cl.
*G06F 30/392* (2020.01)
*G06F 30/398* (2020.01)
*G06F 119/06* (2020.01)

(52) U.S. Cl.
CPC .......... *G06F 30/392* (2020.01); *G06F 30/398* (2020.01); *G06F 2119/06* (2020.01)

(58) Field of Classification Search
CPC ........................... G06F 30/392; G06F 2119/06
USPC .......................................................... 716/133
See application file for complete search history.

(56) References Cited

U.S. PATENT DOCUMENTS

| | | | | |
|---|---|---|---|---|
| 6,393,601 | B1 * | 5/2002 | Tanaka | H01L 27/0207 716/135 |
| 7,492,013 | B2 * | 2/2009 | Correale, Jr. | H01L 27/11807 257/737 |
| 8,719,754 | B1 * | 5/2014 | Ginetti | G06F 30/392 716/119 |
| 8,823,064 | B2 * | 9/2014 | Chang | H01L 21/823437 438/587 |

(Continued)

FOREIGN PATENT DOCUMENTS

| | | | | |
|---|---|---|---|---|
| CN | 106449628 | | 2/2017 | |
| CN | 110232213 | A * | 9/2019 | ......... G06F 17/5009 |

(Continued)

*Primary Examiner* — Suresh Memula
(74) *Attorney, Agent, or Firm* — Jones Day

(57) ABSTRACT

An integrated circuit with mixed poly pitch cells with a plurality of different pitch sizes is disclosed. The integrated circuit includes: at least a minimum unit each with at least a first number of first poly pitch cells with a first pitch size, and a second number of second poly pitch cells with a second pitch size, the first pitch size PP is different from the second pitch size PP1, the greatest common divisor of the first pitch size PP and the second pitch size PP1 is GCD, wherein GCD is an integer greater than 1; a gate length of the first pitch size is Lg; a gate length of the second pitch size is Lg1; Lg and Lg1 are capable of being extended to achieve G-bias for power and speed optimization of the minimum unit and the integrated circuit.

20 Claims, 28 Drawing Sheets

(56) References Cited

U.S. PATENT DOCUMENTS

| | | | |
|---|---|---|---|
| 8,863,048 B1* | 10/2014 | Gerousis | G06F 30/392 |
| | | | 716/55 |
| 9,269,815 B2* | 2/2016 | Cai | H01L 29/66795 |
| 9,449,986 B1* | 9/2016 | Yoon | H10B 43/10 |
| 10,546,956 B2* | 1/2020 | Zhang | H01L 29/165 |
| 10,978,437 B2* | 4/2021 | Holland | H01L 29/94 |
| 2002/0158273 A1* | 10/2002 | Satoh | H10B 41/35 |
| | | | 257/315 |
| 2004/0044511 A1* | 3/2004 | Sekido | G06F 30/367 |
| | | | 703/14 |
| 2004/0083440 A1* | 4/2004 | Houston | H01L 21/823456 |
| | | | 257/E21.624 |
| 2005/0198604 A1* | 9/2005 | Yoshida | H01L 27/0207 |
| | | | 716/119 |
| 2006/0195810 A1* | 8/2006 | Morton | G06F 30/39 |
| | | | 716/130 |
| 2007/0004147 A1* | 1/2007 | Toubou | G06F 30/392 |
| | | | 257/E27.108 |
| 2008/0109767 A1* | 5/2008 | Arimoto | G06F 30/30 |
| | | | 716/135 |
| 2009/0114952 A1* | 5/2009 | Correale, Jr. | H01L 27/0207 |
| | | | 257/E25.01 |
| 2010/0164614 A1* | 7/2010 | Hou | H01L 27/0207 |
| | | | 327/565 |
| 2010/0169847 A1* | 7/2010 | Gupta | G06F 30/39 |
| | | | 716/122 |
| 2013/0256797 A1* | 10/2013 | Chang | H01L 27/0207 |
| | | | 257/E27.06 |
| 2014/0183646 A1* | 7/2014 | Hatamian | G06F 30/398 |
| | | | 716/112 |
| 2014/0223404 A1* | 8/2014 | Gupta | G06F 30/39 |
| | | | 716/133 |
| 2015/0026657 A1* | 1/2015 | Fu | G06F 30/398 |
| | | | 716/136 |
| 2015/0121329 A1* | 4/2015 | Fu | G06F 30/39 |
| | | | 716/133 |
| 2015/0301973 A1* | 10/2015 | Rim | G06F 13/4068 |
| | | | 710/305 |
| 2016/0300005 A1* | 10/2016 | Yang | H01L 27/11807 |
| 2018/0068050 A1* | 3/2018 | Lin | G06F 30/392 |
| 2018/0151561 A1* | 5/2018 | Cantoro | B82Y 10/00 |
| 2019/0147133 A1* | 5/2019 | Lin | G06F 30/392 |
| | | | 716/122 |
| 2019/0287967 A1* | 9/2019 | Liaw | H01L 27/0207 |
| 2019/0288690 A1* | 9/2019 | Yeap | H01L 21/84 |
| 2020/0074043 A1* | 3/2020 | Chang | G06F 30/398 |
| 2020/0098920 A1* | 3/2020 | Chafik | H01L 29/42364 |
| 2020/0104445 A1* | 4/2020 | Peng | H01L 27/11807 |
| 2020/0380191 A1* | 12/2020 | MacRae | G06F 30/398 |
| 2020/0411500 A1* | 12/2020 | Holland | H01L 27/0629 |
| 2021/0313319 A1* | 10/2021 | Sue | H01L 27/0886 |
| 2021/0384127 A1* | 12/2021 | Peng | H01L 21/76816 |

FOREIGN PATENT DOCUMENTS

| | | | | |
|---|---|---|---|---|
| CN | 106449628 B | * | 2/2021 | G06F 17/5072 |
| CN | 113392614 | | 9/2021 | |
| CN | 113392614 A | * | 9/2021 | G06F 30/392 |
| EP | 3079172 | | 10/2016 | |
| EP | 3079172 A1 | * | 10/2016 | G06F 17/5072 |
| JP | 3829088 B2 | * | 10/2006 | G11C 16/26 |
| JP | 4190791 B2 | * | 12/2008 | H01L 21/823857 |
| KR | 19980071225 A | * | 10/1998 | |
| WO | WO 80/001859 | | 9/1980 | |
| WO | WO-8001859 A1 | * | 9/1980 | |
| WO | WO-0233544 A1 | * | 4/2002 | G06F 17/5036 |
| WO | WO-0237552 A2 | * | 5/2002 | H01L 29/66825 |

* cited by examiner

An increased poly cell in a mixed poly pitch

MIXED POLY PITCH DESIGN SOLUTION FOR POWER TRIM

CROSS-REFERENCE TO RELATED APPLICATION

This application is a continuation of U.S. patent application Ser. No. 16/925,483, filed Jul. 10, 2020, which is incorporated herein by reference in its entirety.

BACKGROUND

An integrated circuit (IC) is an electronic circuit manufactured into the surface of a thin substrate of semiconductor material. ICs are used in virtually all electronic equipment today and have revolutionized the world of electronics. Computers, mobile phones, and other digital home appliances are now inextricable parts of the structure of modern societies, made possible by the low cost of producing ICs. IC layout designs are optimized for speed and power before ICs are manufactured.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
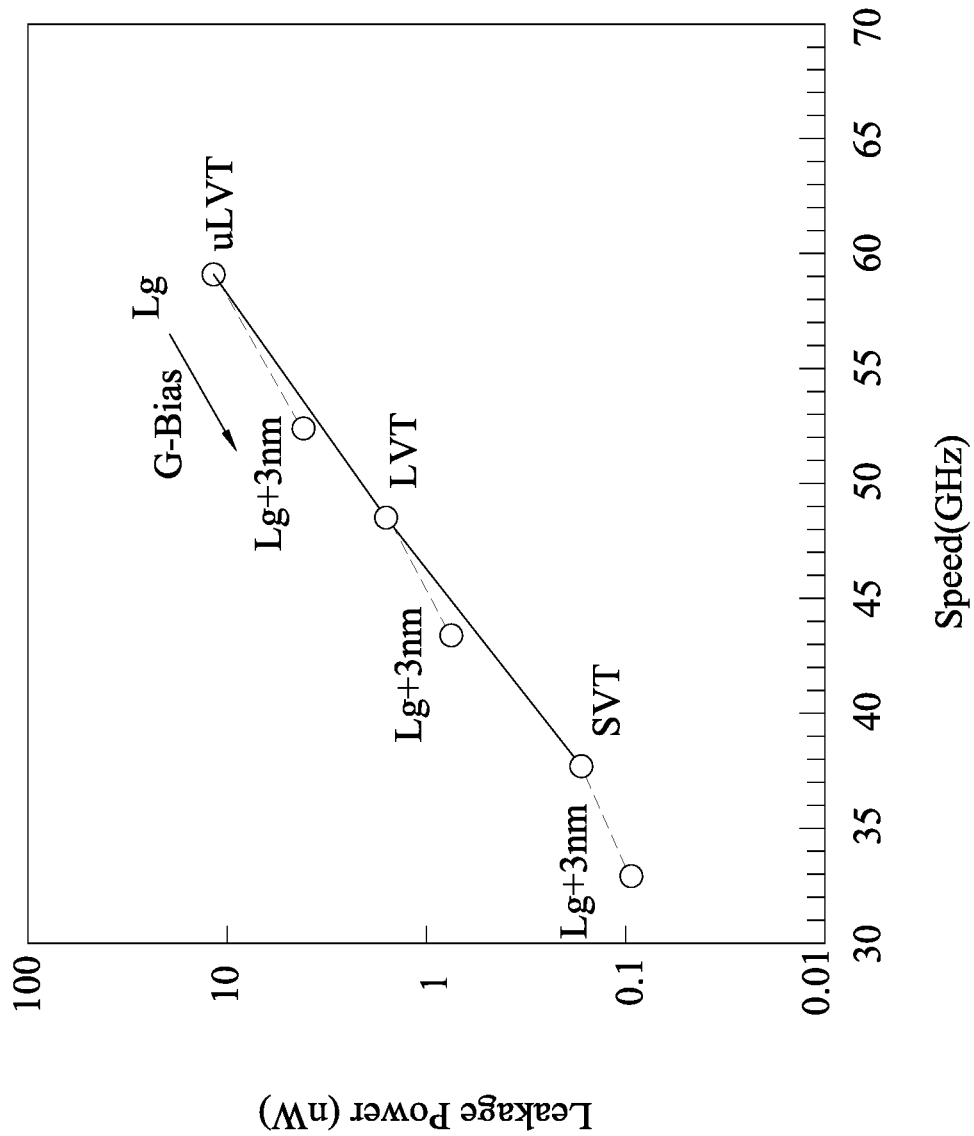
FIG. 1 is a figure illustrating the effect of Lg+3 nm G-bias in a mixed poly pitch upon power and speed according to an exemplary embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

During the manufacturing of integrated circuits, certain operating parameters of the circuits need to be adjusted, or "trimmed". Trimming is typically conducted with laser. For example, one of the most common applications of trimming is conducted using laser to burn away a small portion of the circuit, such as resistors or transistors. Trimming of transistors causes changes in transistor performance, such as power consumption and operating speed. As will be discussed in details below, the trimming of even a few nanometers causes significant effects in power and speed of the IC. As a result, trimming needs to be carefully calculated for each individual cell and well-coordinated among different cells to achieve an overall optimization of the design and manufacturing of the entire circuit. The following paragraphs will give detailed discussions regarding the performance optimization for individual cells, for a group of neighboring cells, and for cells of greater distance away within the same circuit design. Within the entire circuit design, few cells can be trimmed without affecting the performance of the entire circuit, and in return, trimming effects caused by some cells can sometimes be compensated by the trimming of other cells. Often times, speed gain is at the cost of power, and vice versa. Trimming can be implemented to increase the gate length of certain devices, the change in gate length can be measured by a gate parameter modification (GPM). Trimming effects, and the combination of trimming effects will be discussed in further details from FIG. 1 to FIG. 25.

FIG. 1 is a figure illustrating the effect of Lg+3 nm G-bias in a mixed poly pitch upon power and speed according to an exemplary embodiment. The mixed poly pitch power trim design of the systems and methods as disclosed herein implements the effect of Lg+GPM (for example, Lg+3 nm) G-bias upon power and speed. Gate length ("Lg") expansion causes a bias called G-bias in speed-power figure as illustrated in FIG. 1, where the horizontal axis is speed in GHz and the vertical axis is leakage power in nW. According to some embodiments, the three filled dots, namely SVT, LVT and μLVT, designate three different cells with threshold voltages, where SVT stands for standard threshold voltage, LVT stands for low threshold voltage and μLVT stands for ultra-low threshold voltage. As illustrated in FIG. 1, threshold voltage is related to leakage power and there are trade-offs between leakage power and speed. For example, for the fastest μLVT cell, the leakage power is also large. In comparison, LVT is relatively slower than μLVT but consumes less leakage power. SVT has even smaller leakage power than LVT but at the cost of even slower speed.

In the same figure, three empty dots with corresponding dashed lines illustrate the bias effect when the gate length is increased (gate length extension). Gate length extension can effectively reduce leakage power because of smaller sub-threshold leakage. According to some embodiments, the bias illustrated in FIG. 1 is called G-bias. G-bias is an effective approach to reduce device leakage for low power optimization. According to some embodiments, when G-bias is applied to the μLVT cell by increasing the gate length by GPM (for example, GPM=3 nm, Lg+3 nm), both leakage power and speed of the μLVT cell are reduced, which is designated by an empty dot connected to the original filled dot (Lg) with dashed line. Similarly, the G-bias also reduces both leakage power and speed for both LVT and SVT cells, as illustrated in FIG. 1.

Figure 2:
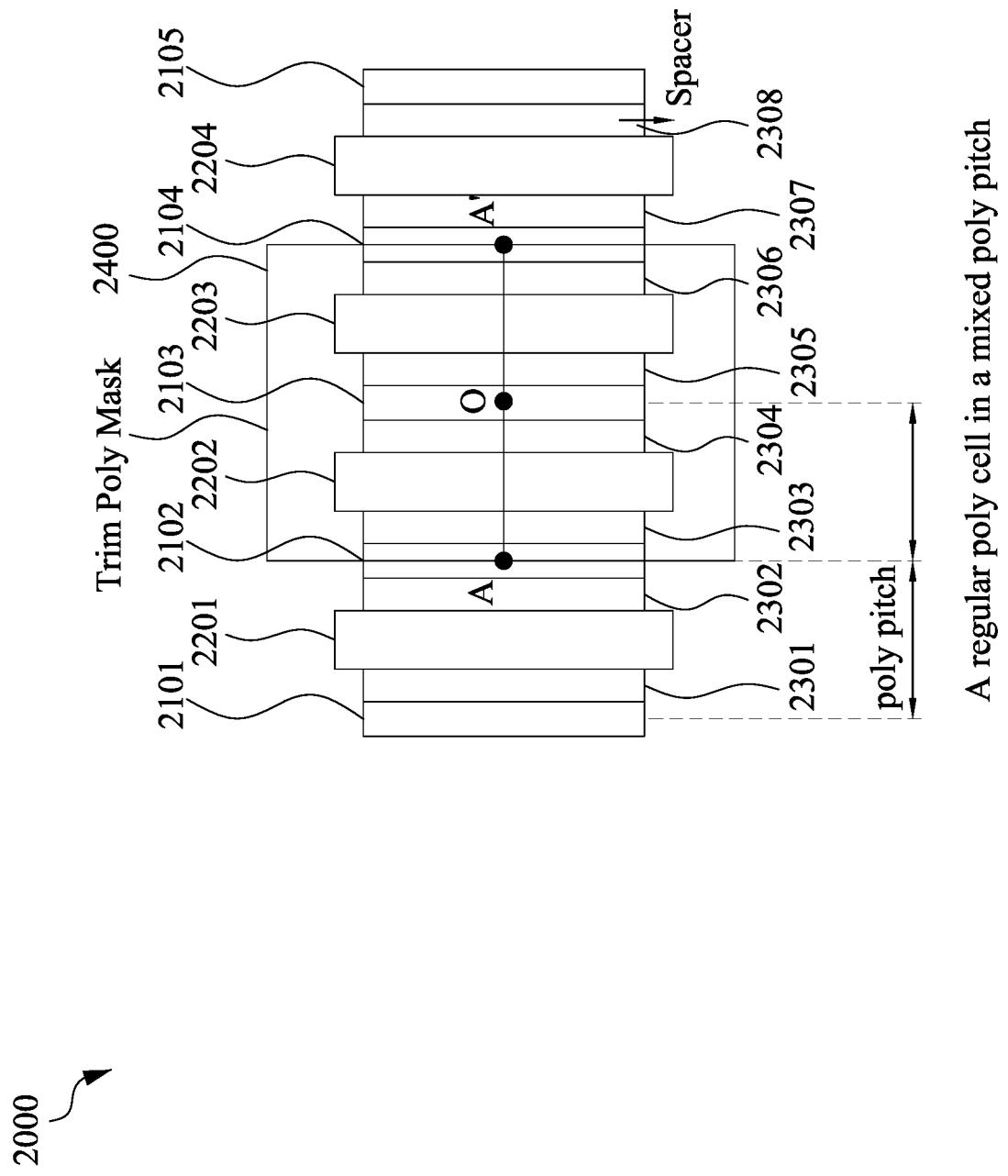
FIG. 2 is a schematic illustrating a regular poly cell in a mixed poly pitch according to the exemplary embodiment.
Figure 3:
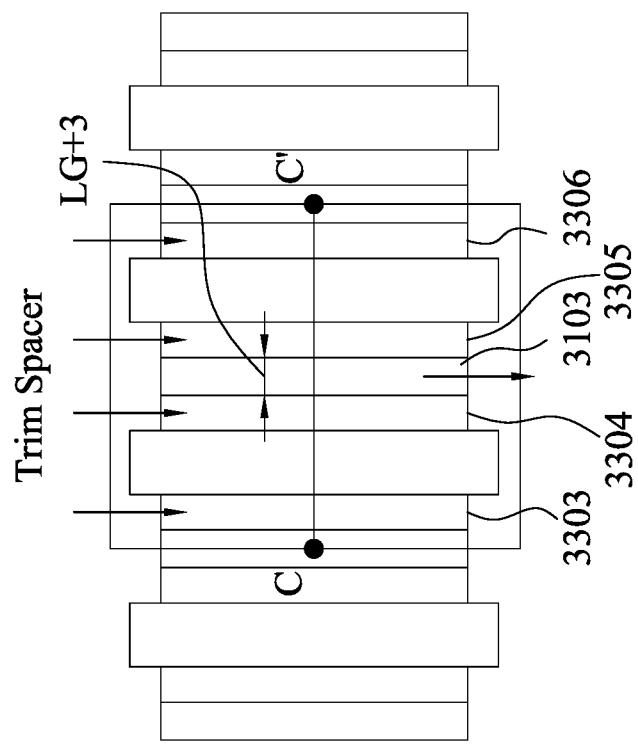
FIG. 3 is a schematic illustrating an increased poly pitch in a mixed poly pitch according to the exemplary embodiment.
Figure 4:
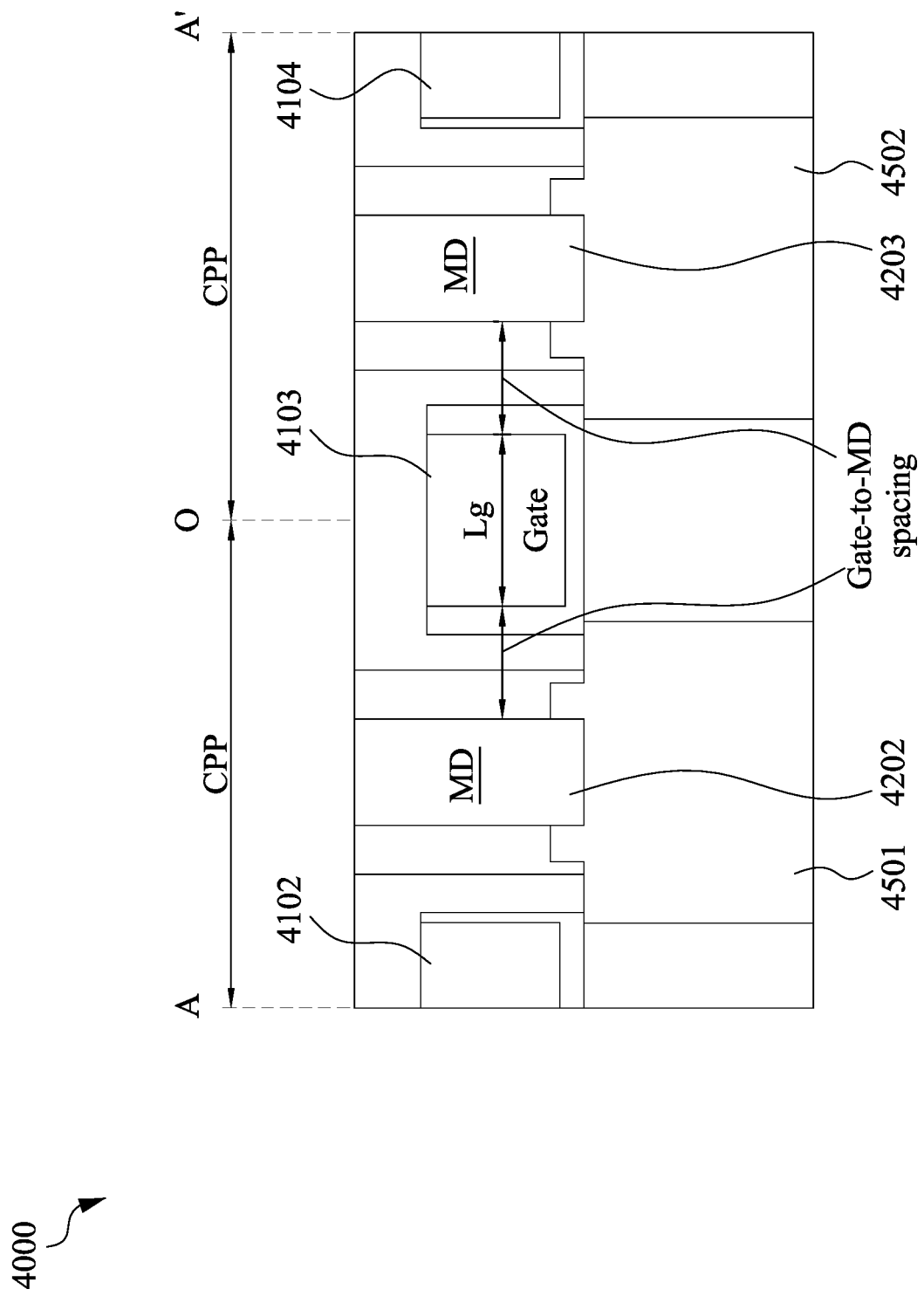
FIG. 4 is a cross-sectional view along line A-A' in FIG. 2 of a normal pitch in a mixed poly pitch according to the exemplary embodiment.
Figure 5:
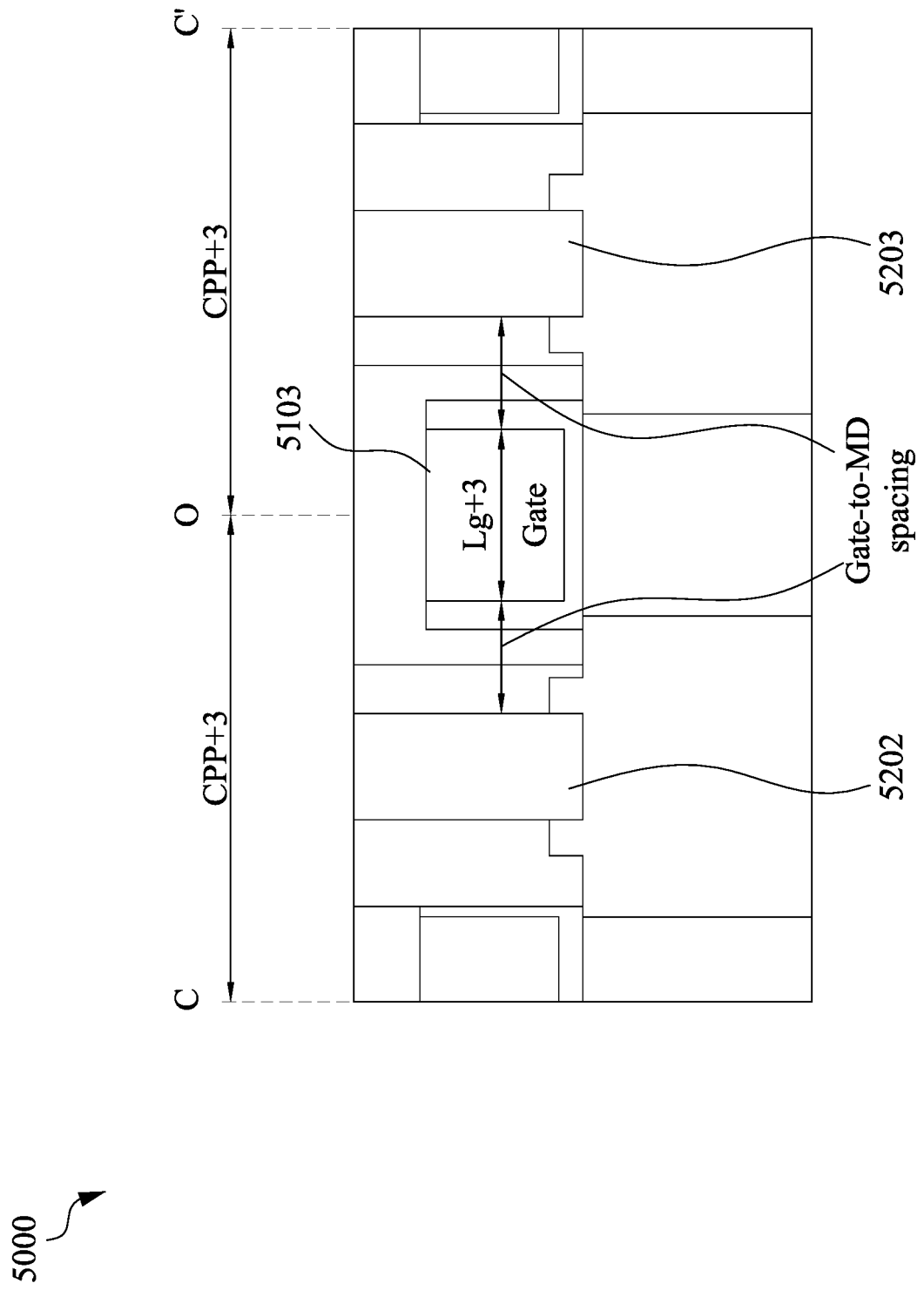
FIG. 5 is a cross-sectional view along line C-C' in FIG. 3 of an extended poly pitch in a mixed poly pitch according to the exemplary embodiment.

FIG. 2 is a schematic illustrating a regular poly cell in a mixed poly pitch according to the exemplary embodiment. The Lg+3 nm G-bias effect discussed in FIG. 1 above are further explained in FIGS. 2-5. FIGS. 2 and 4 illustrate a regular poly pitch, while FIG. 4 is a cut-through cross-sectional view of FIG. 2. In comparison, FIGS. 3 and 5 illustrate an increased poly pitch Lg+GPM (for example, Lg+3 nm), with FIG. 5 as the cut-through cross-sectional view of FIG. 3. In the advanced technology, it is a challenge to etch-back metal gates during manufacturing semiconductor devices due to no selectivity between silicide and metal gates. Transistor gate pitch is also referred to as CPP (contacted poly pitch) and interconnect pitch is also referred to as MMP (minimum metal pitch). Some manufacturers have reported their 10 nm process as having a 64 nm transistor gate pitch and 48 nm interconnect pitch.

Integrated circuit layout design needs to be optimized, for power consumption or for speed, before they are used to manufacture integrated circuits. There are constraints on the floorplan of an IC layout design, for example, cells cannot be freely moved or swapped because of their geometric constraints. Cells can only be moved with certain step sizes, and a cell or a minimum unit can only be moved to another location on the layout which can geometrically accommodate the cell or minimum unit. When cells need to be moved or swapped for power and speed optimizations, such constraints in poly pitch, step sizes and minimum unit size, etc.

According to some embodiments, the poly cell 2000 includes poly lines 2101, 2102, 2103, 2104 and 2105 which are separated by a constant distance called poly pitch. Poly pitch is defined as the distance between the center of two closest poly lines, for example, 2101 and 2102. Between the poly lines, mid-diffusion ("MD") layers 2201, 2202, 2203 and 2204 are deployed. The MD layer is the diffusion layer manufactured in mid-end process, as compared to front-end process and back-end process. Front-end process refers to wafer processing operation, back-end process refers to assembly process, mid-end process refers to the operations in between. According to some embodiments, the MD layer refers to the diffusion layer between source/drain active area. Atomic diffusion in semiconductors refers to the migration of atoms, including host, dopant and impurities. For example, in a binary semiconductor such as GaAs, Ga atoms can migrate over the Ga sublattice via jumps into nearest neighbor Ga vacancies, as can dopant atoms substituting on Ga sites. Spacers 2301-2308 are deployed between poly lines and diffusion layers to filled the space. A trim poly mask 2400 is deployed to cover at least partially the poly cell 2000. When the poly cell 2000 is cut along line A-A', a cross-sectional view along line A-A' is shown in FIG. 4 below.

FIG. 3 is a schematic illustrating an increased poly pitch in a mixed poly pitch according to the exemplary embodiment. The increased poly pitch structure Lg+GPM (for example, Lg+3 nm) of the of systems and methods as discussed in FIG. 1 above is illustrated in FIG. 3. With the development of technology, while poly pitch keeps scaling aggressively, it remains very challenging to extend gate length in the same poly pitch. G-bias technique mentioned above requires poly pitch increase which comes with area scaling penalty. According to some embodiments, the spacers 3304 and 3305 on the left and right sides of the gate 3103 can be trimmed by, for example laser. Laser burns away certain amount of the spacer materials to increase the length of the gate 3103. The amount of the spacer trimmed away can be called gate parameter modification (GPM). According to some embodiments, GPM is 3 nm. For example, the length of the gate can be increased from Lg to Lg+GPM. According to some embodiments, the length of the gate can be increased from Lg to Lg+3 nm. Trimming can also be achieved by chemical etching and other physical and chemical methods. As discussed in FIG. 1, when the gate length is increased from Lg to Lg+3 nm, G-bias effect decreases the speed of the device while at the same time decreases the leakage power of the device. On a design layout, some cells are functional cells on the speed critical unit while other functional cells are on non-timing critical unit. A decrease in speed as a result of increasing Lg to Lg+3 nm for functional cells on the speed critical unit would not be desirable, while a decrease in speed as a result of increasing Lg to Lg+3 nm for non-timing critical unit does not affect the overall performance of the design. Due to the G-bias effect discussed above, increasing Lg to Lg+3 nm for dummy cells also decreases leakage power of the cells on non-timing critical unit. Overall, when all cells on non-timing critical unit are trimmed to increase the gate length from Lg to Lg+3 nm, the overall speed of the circuit is not affected, while the overall leakage power of the circuit is reduced, according to G-bias effect. Those skilled in the art should appreciate that the GPM can be numbers other than 3 nm, and 3 nm is only an example for illustration purpose. According to some embodiments, poly cell 3000 is a poly cell with extended gate length Lg+3 nm, which means that the width of the gate poly line 3103 is increased by 3 nm in the same poly pitch. And neighboring spacers 3304 and 3305 are appropriately trimmed to accommodate the extension of poly line 3103. A cross-sectional view along line C-C' is shown in FIG. 5 below.

FIG. 4 is a cross-sectional view along line A-A' in FIG. 2 of a normal pitch in a mixed poly pitch according to the exemplary embodiment. As discussed earlier, FIG. 4 illustrates a cut-through cross-sectional view of the regular poly pitch of systems and methods as disclosed in FIG. 2 above. According to some embodiments, the MD layers 4202 and 4203 correspond to diffusion layer 2202 and 2203 in FIG. 2. The distance OA and OA' are equal to one poly pitch (1CPP, or simply CPP). The gate 4103 has a corresponding gate length Lg. 4501 and 4502 are source and drain respectively.

FIG. 5 is a cross-sectional view along line C-C' in FIG. 3 of an extended poly pitch in a mixed poly pitch according to the exemplary embodiment. As discussed earlier, FIG. 5 illustrates a cut-through cross-sectional view of the increased poly pitch of systems and methods as disclosed in FIG. 3. As a comparison to FIG. 4, the gate 5103 is increased in length by 3 nm, as a result, the poly pitch OC and OC' are also increased by 3 nm (CPP+3), while the gate to MD spacing is kept unchanged. As discussed earlier, the gate length increase is achieved by trimming of neighboring spacer materials by the amount of GPM. The gate length increase invokes G-bias effect to reduce both speed and leakage power of the units. When such gate length increase is only applied to non-timing critical units, then the overall timing of the design is hardly affected, but the overall leakage power is reduced due to G-bias effect discussed earlier.

Figure 6:
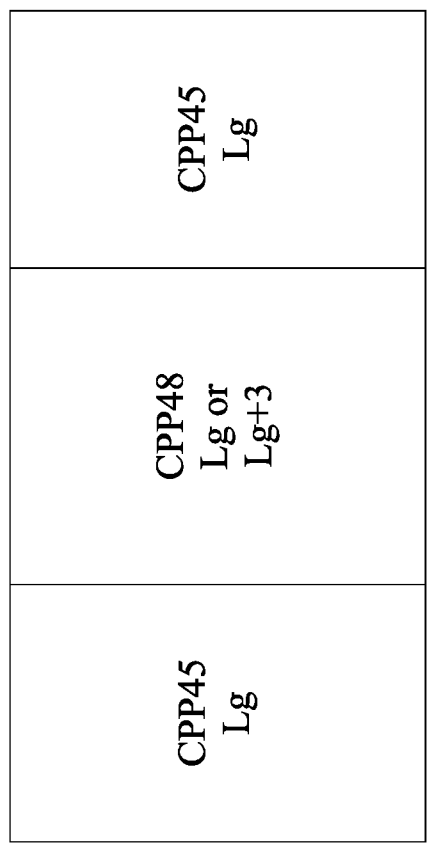
FIG. 6 illustrates a mixed poly pitch design according to the exemplary embodiment.

FIG. 6 illustrates a mixed poly pitch design according to the exemplary embodiment. According to some embodiments, the mixed poly pitch in FIG. 6 can achieve larger process window, better PPA (performance power area) and more complex flow. In the "as is" column, the box with (CPP48, Lg) designate a poly cell with poly pitch 48 and regular gate length Lg; the middle box with (CPP48, Lg+3) designates a poly cell with poly pitch 48 and an enlarged (by 3 nm) gate length Lg+3; the right box is another (CPP48, Lg) cell. In comparison, in the "Mixed Poly Pitch" column, the left cell is (CPP45, Lg) which designates poly pitch of 45 with a regular gate length Lg; the middle cell (CPP48, Lg) or (CPP48, Lg+3) is a poly pitch of 48 with a regular gate length Lg, or an extended gate length Lg+3; the right cell is another (CPP45, Lg). The three cells (CPP45, Lg)(CPP48, Lg)(CPP45, Lg) can be called a unit; alternatively.

Figure 7:
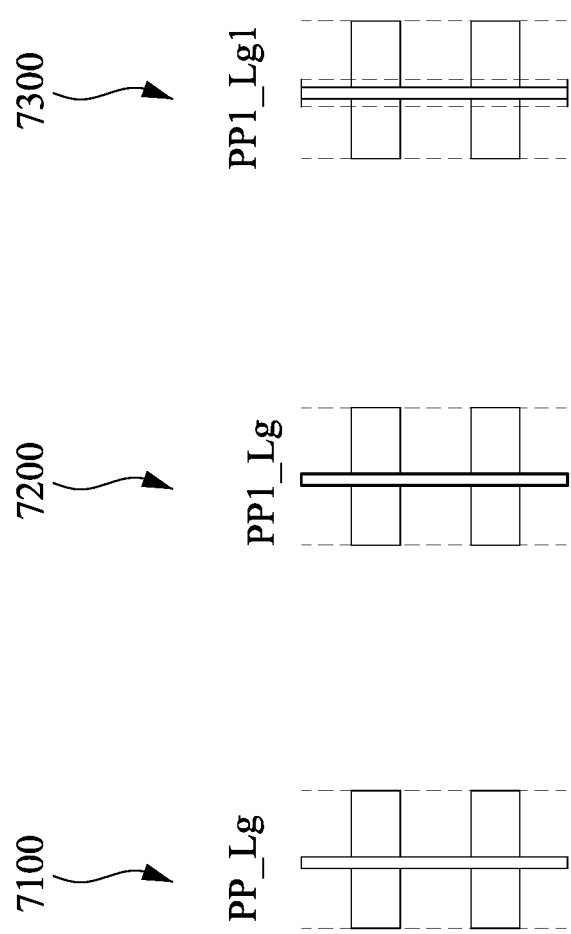
FIG. 7 is a schematic illustrating three poly pitch and gate length combinations of equivalent cell types according to the exemplary embodiment.

FIG. 7 is a schematic illustrating three poly pitch and gate length combinations of equivalent cell types according to the exemplary embodiment. According to some embodiments, the poly cell 7100 PP_Lg is a cell with a poly pitch PP and regular gate length Lg; the poly cell 7200 PP1_Lg is a cell with a second poly pitch PP1 and regular gate length Lg; the poly cell 7300 PP1_Lg1 is a cell with the second poly pitch PP1 and an extended gate length Lg1. According to some embodiments, for example, PP=45, PP1=48, and Lg1=Lg+3. According to some embodiments, an equivalent cell type is a type of cells with the same number of pitches, which are no greater than the minimum unit to be fitted into the minimum unit. Within the same equivalent cell type, there can be different combinations of pitch sizes and gate lengths. Because they have the same number of pitches, one cell in the same equivalent type can sometimes replace another cell with a different gate length. Due to the G-bias discussed above, such replacement can change the speed and power of the integrated circuit. Accordingly, speed and power optimization can be achieved by tweaking different cells within the same equivalent cell type. For example, the poly cells 7200 and 7300 are of the same pitch size PP1 but with different gate length, Lg and Lg 1, respectively. By replacing the poly cell 7200 with 7300, leakage power is reduced due to G-bias as discussed above. On the other hand, when the poly cell 7300 is replaced by 7200, speed is increased due to G-bias discussed above. Because the number of equivalent cells in each type is rather limited especially when the size of the minimum unit is small. In the worst case scenario, a minimum or maximum value can be located when all equivalent cells are exhausted in the same type. This tweaking process is also called optimization. Various optimization algorithms are well known.

Figure 8B:
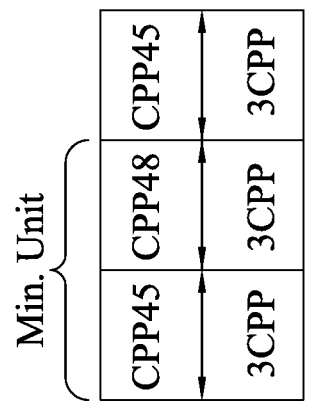
FIG. 8A and FIG. 8B are schematics illustrating symmetric 2CPP and 3CPP designs of equivalent cell types according to the exemplary embodiment.
Figure 8A:
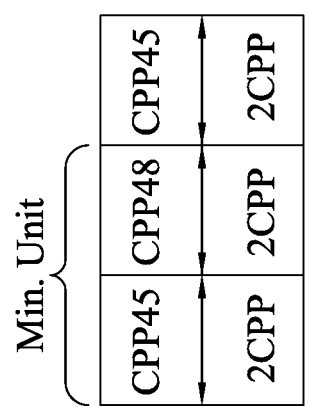
Figure 9A:
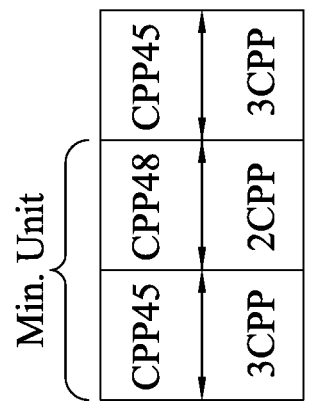
FIG. 9A and FIG. 9B are schematics illustrating asymmetric 2CPP and 3CPP designs of equivalent cell types according to the exemplary embodiment.
Figure 9B:
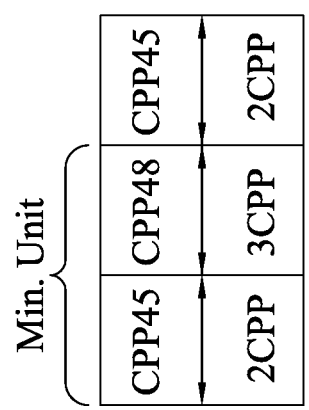

FIG. 8A and FIG. 8B are schematics illustrating asymmetric 2CPP and 3CPP designs of equivalent cell types according to the exemplary embodiment. FIG. 9A and FIG. 9B are schematics illustrating asymmetric 2CPP and 3CPP designs of equivalent cell types according to the exemplary embodiment. In both FIG. 8A/B and FIG. 9A/B, cells (CPP45, CPP48) are called minimum units which are capable of being repeated over the floorplan as basic blocks. The difference is that in FIG. 8A/B, both CPP45 and CPP48 have the same number of poly pitches, for example, 2CPP, 3CPP or 4CPP; while in FIG. 9A/B, CPP45 has 2CPP and CPP48 has 3CPP, or vice versa. FIG. 8A/B is called symmetric ratio, FIG. 9A/B is called asymmetric ratio. As discussed above, in each 2CPP or 3CPP equivalent types, cells can be replaced by equivalent cells to optimize speed and power.

Figure 10:
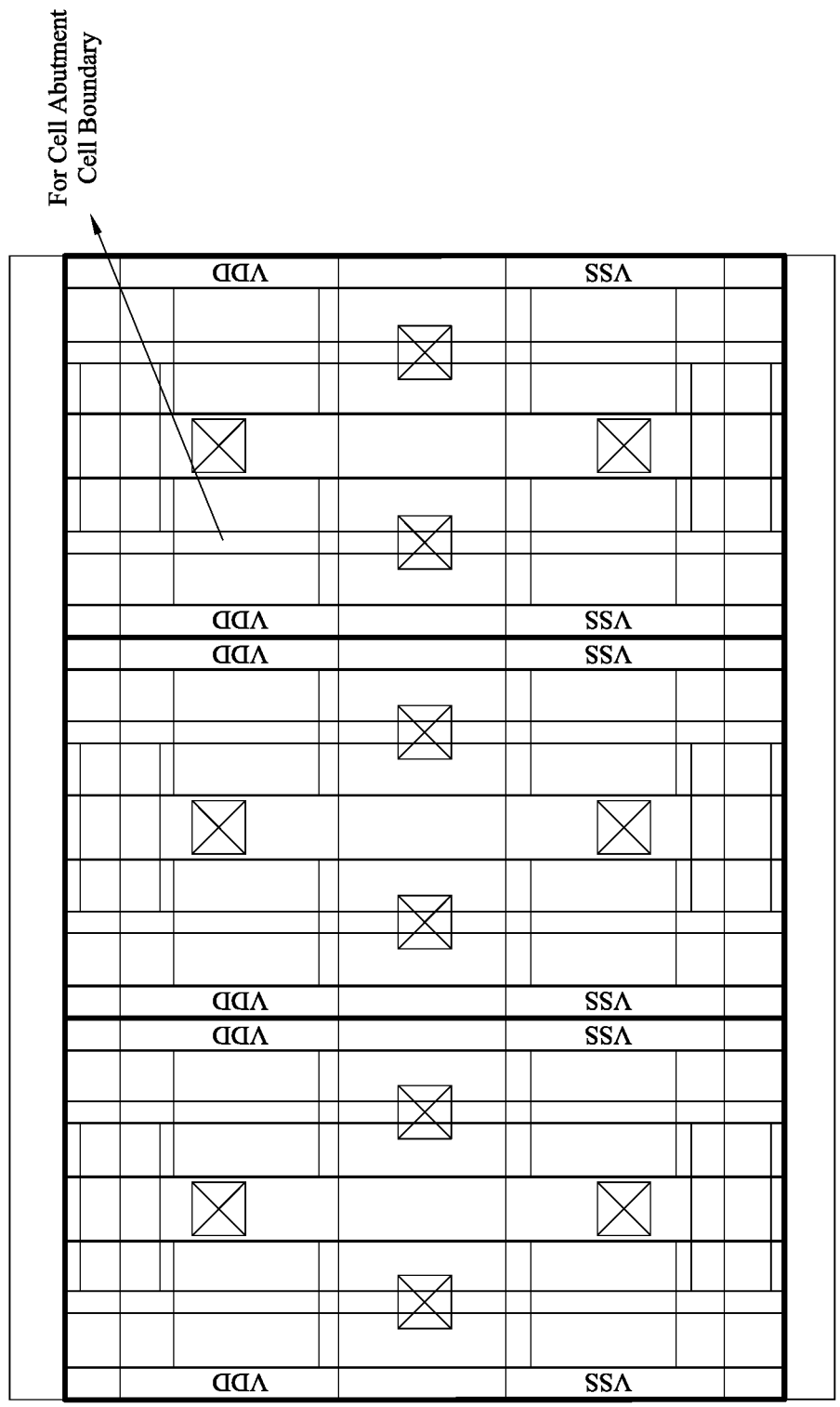
FIG. 10 is a schematic illustrating cell abutment according to an exemplary embodiment.

FIG. 10 is a schematic illustrating cell abutment according to an exemplary embodiment. According to some embodiments, in general standard cell structure, cell boundaries are aligned to MD centers, and cell boundary should be VDD or VSS. The implication will be discussed in FIG. 11 below.

Figure 11:
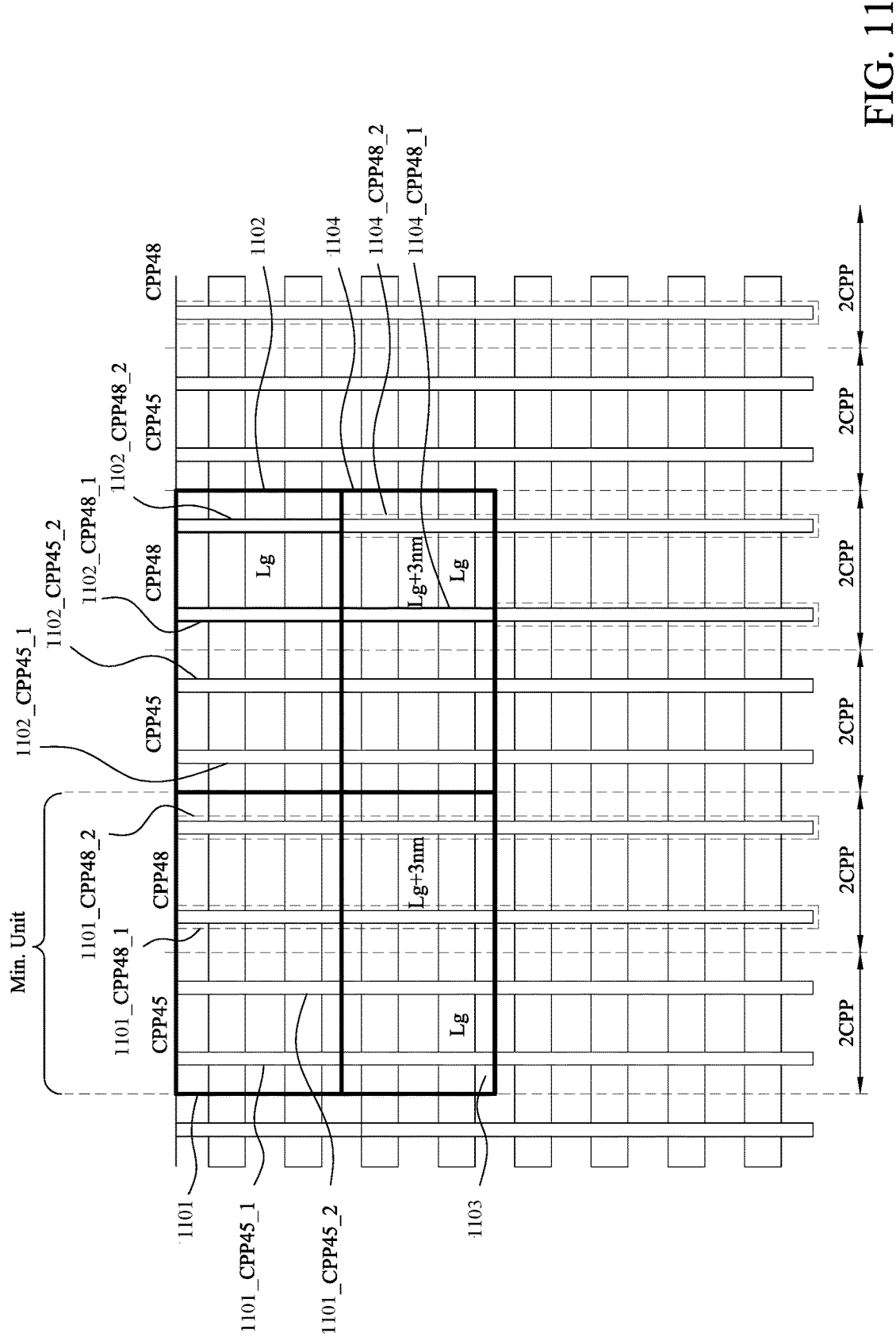
FIG. 11 is a schematic illustrating mixed poly pitch floorplan of equivalent cell types according to the exemplary embodiment.

FIG. 11 is a schematic illustrating mixed poly pitch floorplan using minimal units of equivalent cell types according to the exemplary embodiment. According to some embodiments, symmetric ratio 2CPP minimum units are deployed on the floorplan, for example, minimum units 1101-1104 are four such 2CPP minimum units (CPP45, CPP48). Minimum units 1101 and 1103 are of the same configurations, with two CPP45 poly cells with regular gate length Lg on the left and two CPP48 poly cells with extended gate length Lg+3 nm abutting to the right of (CPP45, Lg) cells. On the left 2CPP of the minimum unit 1102, there are two CPP45 poly cells with regular gate length Lg. On the right 2CPP of the minimum unit 1102, there are two CPP48 poly cells with regular gate length Lg. In comparison, the right 2CPP of the minimum unit 1104, there is one CPP48 poly cell with regular gate length Lg, there is another CPP48 poly cell with extended gate length Lg+3 nm. More specifically, in the minimum unit 1101, 1101_CPP45_1 and 1101_CPP45_2 are two poly lines with poly pitch 45, both with gate length Lg. In comparison, 1101_CPP48_1 and 1101_CPP48_2 are two poly lines with poly pitch 48, but with gate length Lg+3 nm. The minimum unit 1103 below 1101 has similar configurations. By contrast, the minimum unit 1102 to the right of the minimum unit 1101 has a different configuration, in that, the poly lines 1102_CPP48_1 and 1102_CPP48_2 have a pitch size of 48 and regular gate length Lg. In comparison to the minimum unit 1102, the minimum unit 1104 has two poly lines 1104_CPP48_1 and 1104_CPP48_2 with pitch size 48, but the poly lines 1104_CPP48_1 and 1104_CPP48_2 have differing gate lengths: 1104_CPP48_1 has a gate length of Lg and 1104_CPP48_2 has a gate length of Lg+3 nm. As discussed above, regular gate length Lg is for high performance, and Lg+3 nm is for leakage power reduction. As discussed above, the minimum units are rectangles of equal sizes deployed over the floorplan. Minimum units can contain different cells in the same equivalent cell types, i.e. with different leakage power and speed, without affecting the physical size of the minimum units. According to the abutment rules discussed on FIG. 14, Type A can only abut Type C, and Type B can only abut Type D. As discussed above, by tweaking the equivalent cells in the same type, power and speed optimization can be achieved locally and globally with well-known algorithms.

Figure 12:
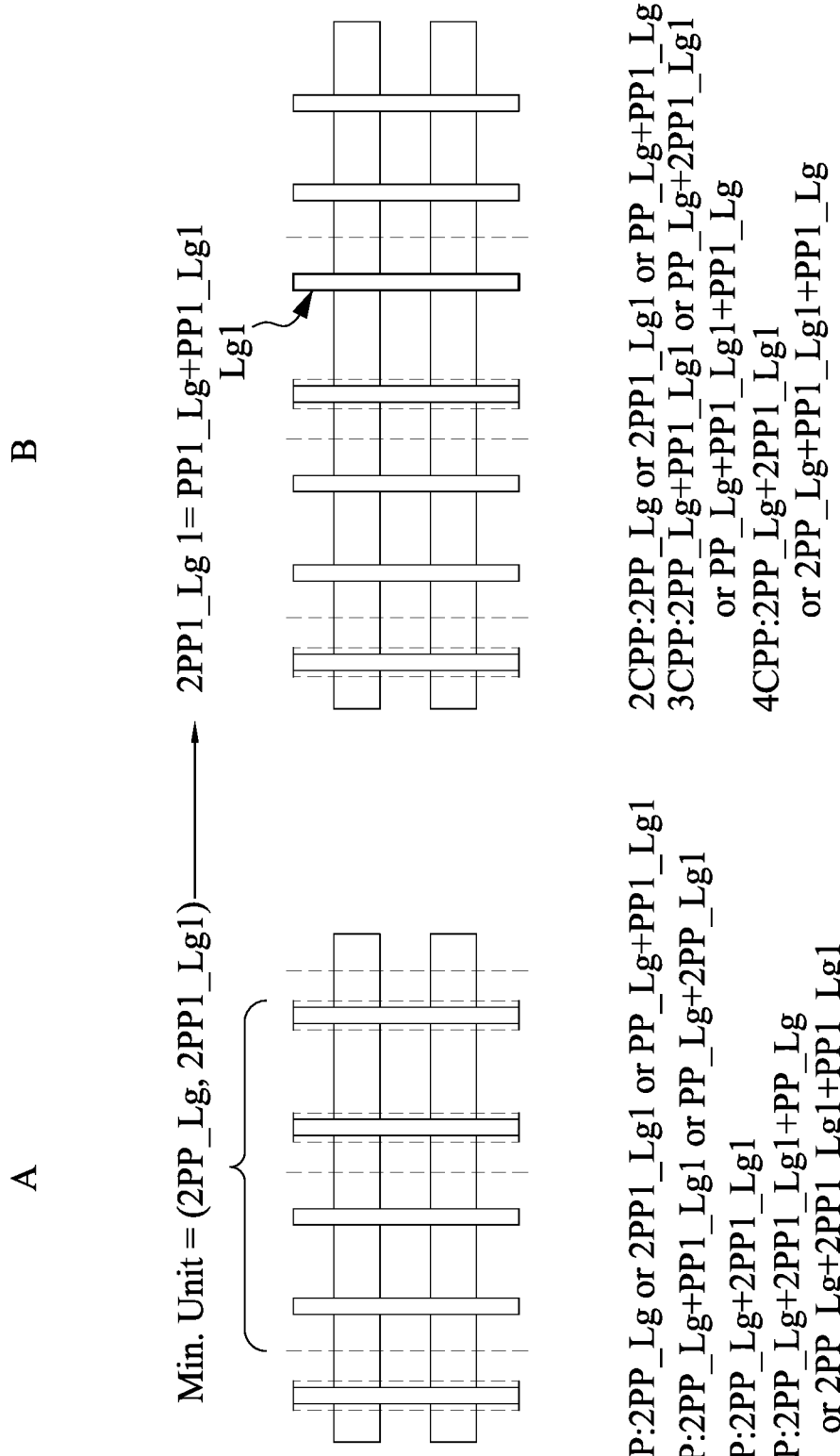
FIG. 12 is a schematic illustrating different combinations of mixed poly pitch and gate length of equivalent cell types according to the exemplary embodiment.

FIG. 12 is a schematic illustrating different combinations of mixed poly pitch and gate length of equivalent cell types according to the exemplary embodiment. In diagram of FIG. 12, minimum unit (2PP_Lg, 2PP1_Lg1) is illustrated, poly cell 2PP_Lg is on the left of the minimum unit and poly cell 2PP1_Lg1 is on the right. Different combinations of 2CPP, 3CPP, 4CPP and 5CPP are listed under the diagram A of FIG. 12 as equivalent types as discussed above. For 2CPP, the equivalent type includes: 2PP_Lg, or 2PP1_Lg1, or PP_Lg+PP1_Lg1; for 3CPP, the equivalent type includes: 2PP_Lg+PP1_Lg1, or PP_Lg+2PP1_Lg1; for 4CPP, the equivalent type includes: 2PP_Lg+2PP1_Lg1; and for 5CPP: 2PP_Lg+2PP1_Lg1+PP_Lg, or 2PP_Lg+2PP1_Lg1+PP1_Lg1. Diagram B of FIG. 12 is a variation of diagram A of FIG. 12 because 2PP1_Lg1=PP_Lg+PP1_Lg1. Similarly, the equivalent type combination for 2CPP are: 2PP_Lg or 2PP1_Lg1 or PP_Lg+PP1_Lg; the equivalent type combination for 3CPP are: 2PP_Lg+PP1_Lg1, or PP_Lg+2PP1_Lg1, or PP_Lg+PP1_Lg1+PP1_Lg; the equivalent type combination for 4CPP are: 2PP_Lg+2PP1_Lg1, or 2PP_Lg+PP1_Lg1+PP1_Lg. As discussed above, one cell can be replaced by another cell in the same equivalent type to achieve performance and/or power optimization without affecting the physical layout because cells of equivalent type can fit into the same minimum unit with varied power and speed.

Figure 13:
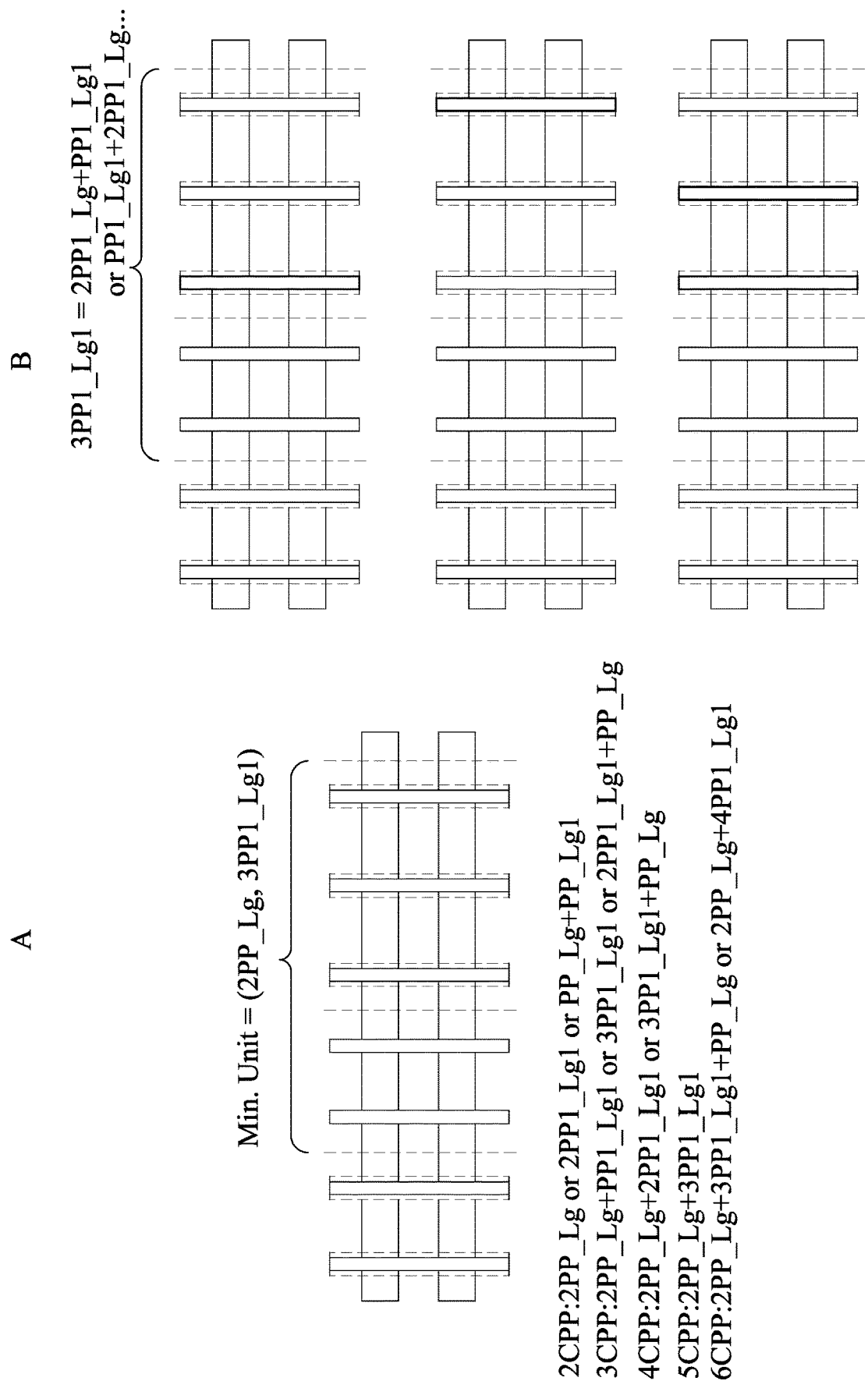
FIG. 13 is a schematic illustrating different combinations of mixed poly pitch and gate length of equivalent cell types according to the exemplary embodiment.

FIG. 13 is a schematic illustrating different combinations of mixed poly pitch and gate length of equivalent cell types according to the exemplary embodiment. In diagram A of FIG. 13, a minimum unit (2PP_Lg, 3PP1_Lg1) is illustrated. Different combinations for 2CPP-6CPP equivalent types are listed. For 2CPP equivalent type: 2PP_Lg, or 2PP1_Lg1, or PP_Lg+PP_Lg 1; for 3CPP equivalent type: 2PP_Lg+PP1_Lg1, or 3PP1_Lg1, or 2PP1_Lg1+PP_Lg; for 4CPP equivalent type: 2PP_Lg+2PP1_Lg1, or 3PP1_Lg 1+PP_Lg; for 5CPP equivalent type: 2PP_Lg+3PP1_Lg1; for 6CPP equivalent type: 2PP_Lg+3PP1_Lg1+PP_Lg, or 2PP_Lg+4PP1_Lg1. Diagram B of FIG. 13 illustrates three equivalent type embodiments for 3PP1_Lg1, where 3PP1_Lg1=2PP1_Lg+PP1_Lg1, or PP_Lg1+2PP1_Lg. As discussed above, equivalent type cells can be tweaked for performance and power optimization purposes.

Figure 14:
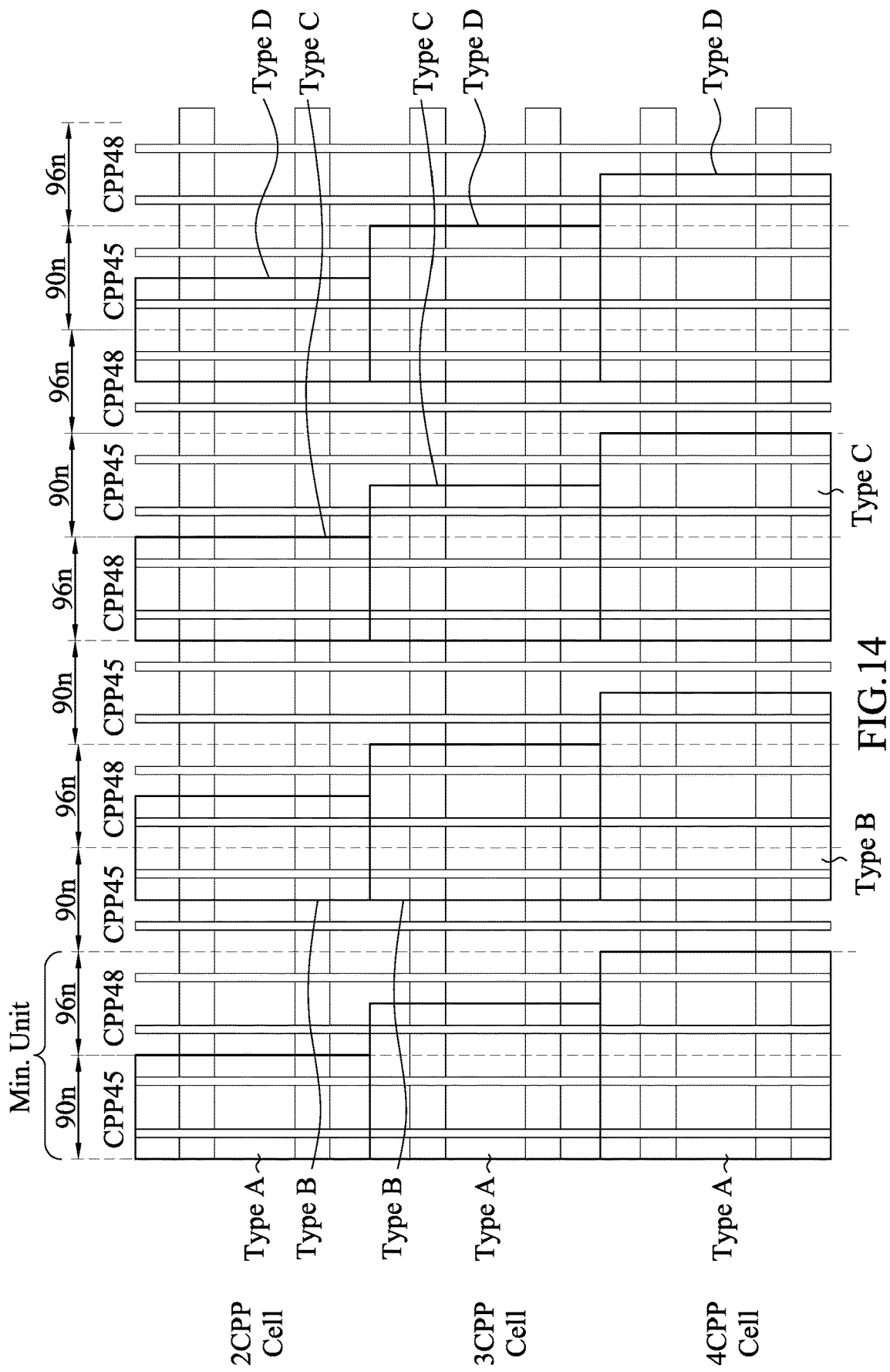
FIG. 14 is a schematic illustrating the placement of four types of cells of equivalent cell types according to the exemplary embodiment.
Figure 15:
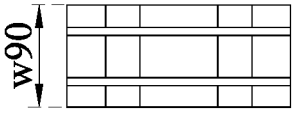
FIG. 15 is another schematic illustrating the placement of four types of cells of equivalent cell types according to the exemplary embodiment.

FIG. 14 is a schematic illustrating the placement of four types of cells of equivalent cell types according to the exemplary embodiment. FIG. 15 is another schematic illustrating the placement of four types of cells of equivalent cell types according to the exemplary embodiment. According to some embodiments, there are four types of poly cells: Type A, Type B, Type C and Type D. Each type can be a 2CPP cell, a 3CPP cell or a 4CPP cell, etc. In FIG. 14, there are 12 cells illustrated: 2CPP equivalent Type A, 2CPP equivalent Type B, 2CPP equivalent Type C, 2CPP equivalent Type D, 3CPP equivalent Type A, 3CPP equivalent Type B, 3CPP equivalent Type C, 3CPP equivalent Type D, 4CPP equivalent Type A, 4CPP equivalent Type B, 4CPP equivalent Type C, 4CPP equivalent Type D. A minimum unit is (2CPP45, 2CPP48). As illustrated in FIGS. 14 and 15, within the minimum unit, up to four CPP can be accommodated. As illustrated in FIG. 15, the widths of equivalent Types A, B, C, D for 2 pitch cells are: 90 nm (45 pitch+45 pitch), 93 nm (45 pitch+48 pitch), 96 nm (48 pitch+48 pitch), and 93 nm (48 pitch+45 pitch), respectively; the widths of Types A, B, C, D for 3 pitch cells are 138 nm (45 pitch+45 pitch+48 pitch), 141 nm (45 pitch+48 pitch+48 pitch), 141 nm (48 pitch+48 pitch+45 pitch), and 138 nm (48 pitch+45 pitch+45 pitch), respectively; for 4 pitch cells, the widths for Types A-D are all the same: 186 nm (45 pitch+45 pitch+48 pitch+48 pitch).

Figure 16:
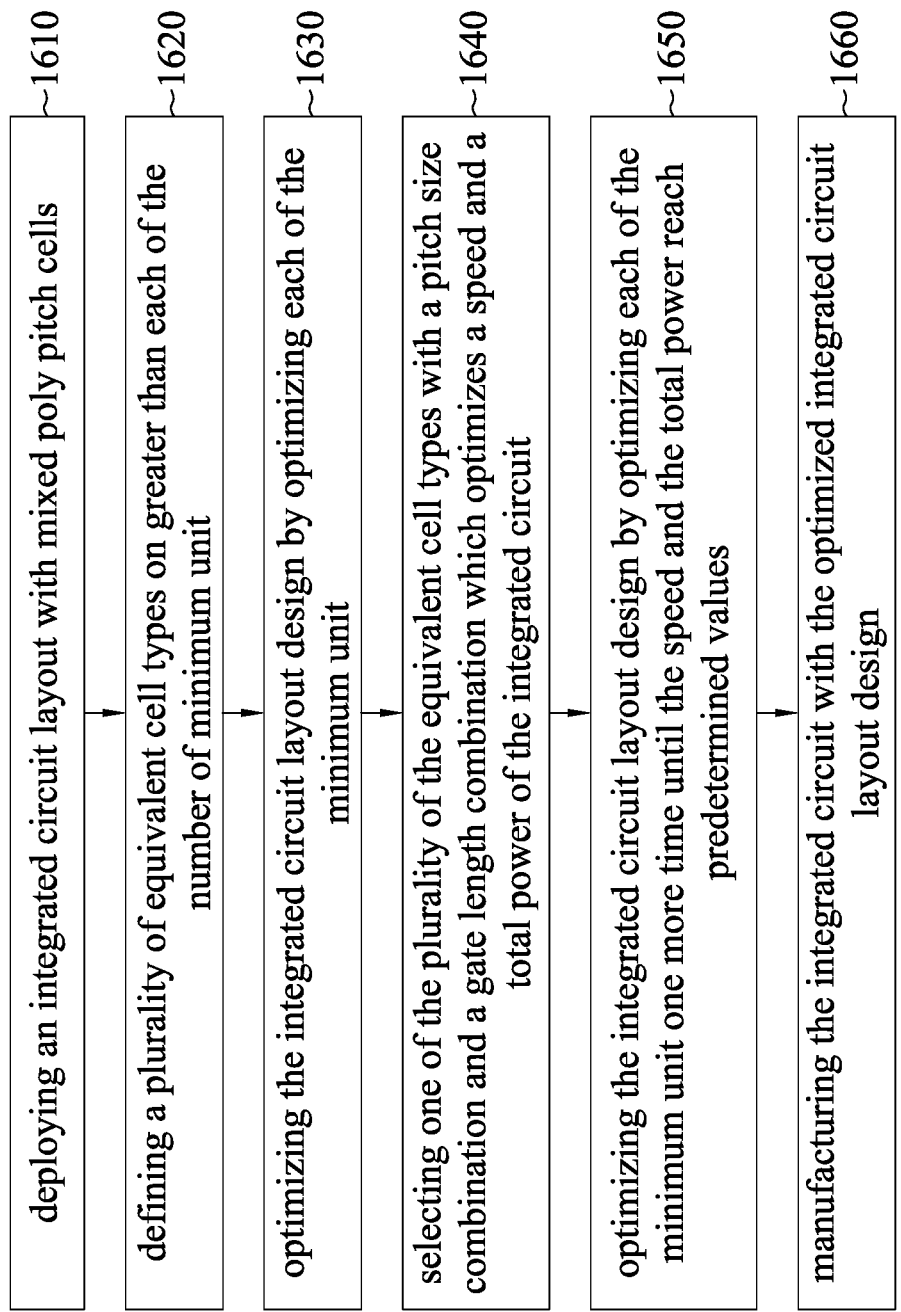
FIG. 16 is a flow chart illustrating a method of layout design optimization using mixed poly pitch cells for manufacturing integrated circuit according to the exemplary embodiment.

FIG. 16 is a flow chart illustrating a method of layout design optimization using mixed poly pitch cells for manufacturing integrated circuit according to the exemplary embodiment. The first step 1610 of the method is deploying an integrated circuit layout with mixed poly pitch cells. The integrated circuit layout includes a number of minimum unit each with at least a first number of first poly pitch cells with a first pitch size, and a second number of second poly pitch cells with a second pitch size. Both the first number and the second number are integers larger than 1. The first pitch size PP is different from the second pitch size PP1. A gate length of the first pitch size is Lg and a gate length of the second pitch size is Lg 1. The method includes the next step 1620 of defining a plurality of equivalent cell types no greater than each of the number of minimum unit. The equivalent cell types are discussed above in FIGS. 7-15. The method includes the next step 1630 of optimizing the integrated circuit layout design by optimizing each of the minimum unit. The optimizing each of the minimum unit is achieved by step 1640 selecting one of the plurality of the equivalent cell types with a pitch size combination and a gate length combination which optimizes a speed and a total power of the integrated circuit. The optimization include placement optimization, clock tree timing optimization and routing optimization. The optimization processed can be repeated until the performance and/or power reaches predetermined values, which is step 1650. At step 1660, manufacturing the integrated circuit with the optimized integrated circuit layout deign. The minimum unit in this context is by definition the legalized step of moving on the layout floor plan, making the minimum units the smallest design blocks in the layout. During the optimization process, the optimization can be repeated until the power and/or speed reach predetermined values, or alternatively, the optimization can be repeated a predetermined number of iterations.

Figure 17:
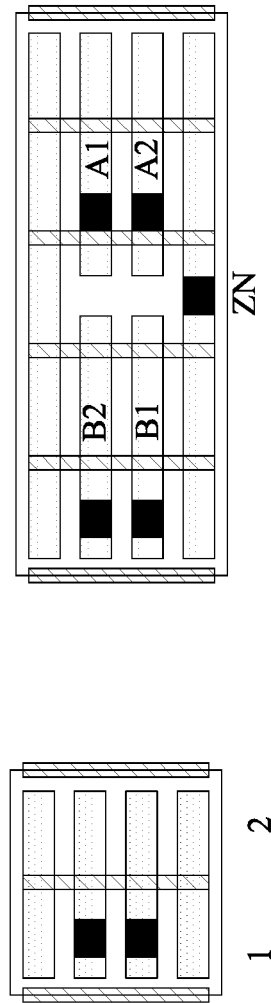
FIG. 17 is a schematic illustrating the floorplans of three devices according to the exemplary embodiment.
Figure 17:
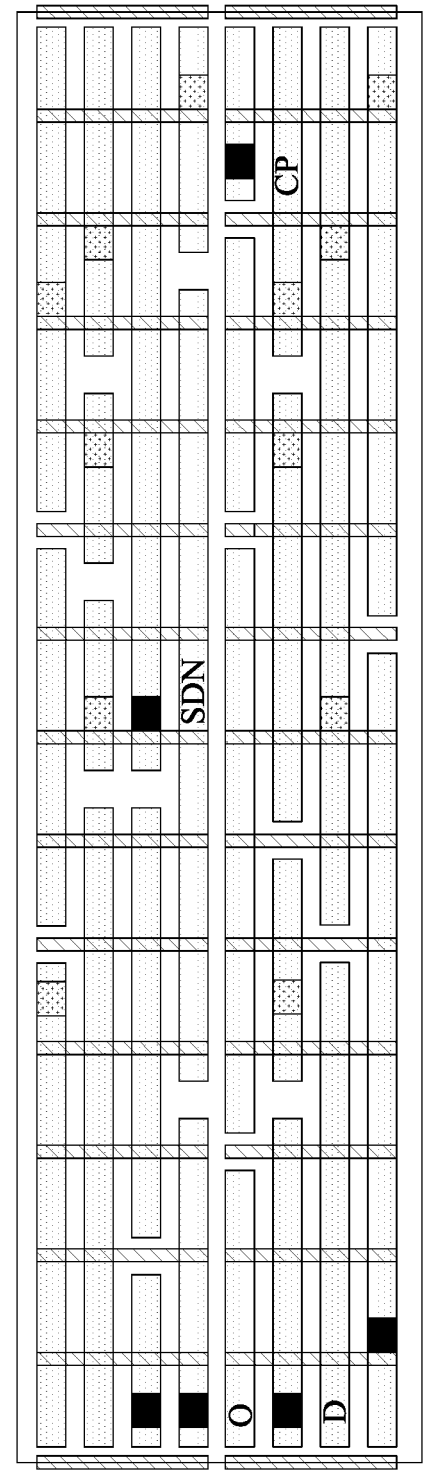

FIG. 17 is a schematic illustrating the floorplans of three devices according to the exemplary embodiment. On the left, the layout of an inverter INVD occupies 2 pitches (2CPP). In the middle, an AOI22 gate occupies 5 pitches (5CPP); on the right, a flip-flop with reset function occupies 13 pitches (13CPP). For a minimum unit to accommodate all cells in a library, for example a standard library, the minimum unit can choose a pitch size of 20 (20CPP).

Figure 18:
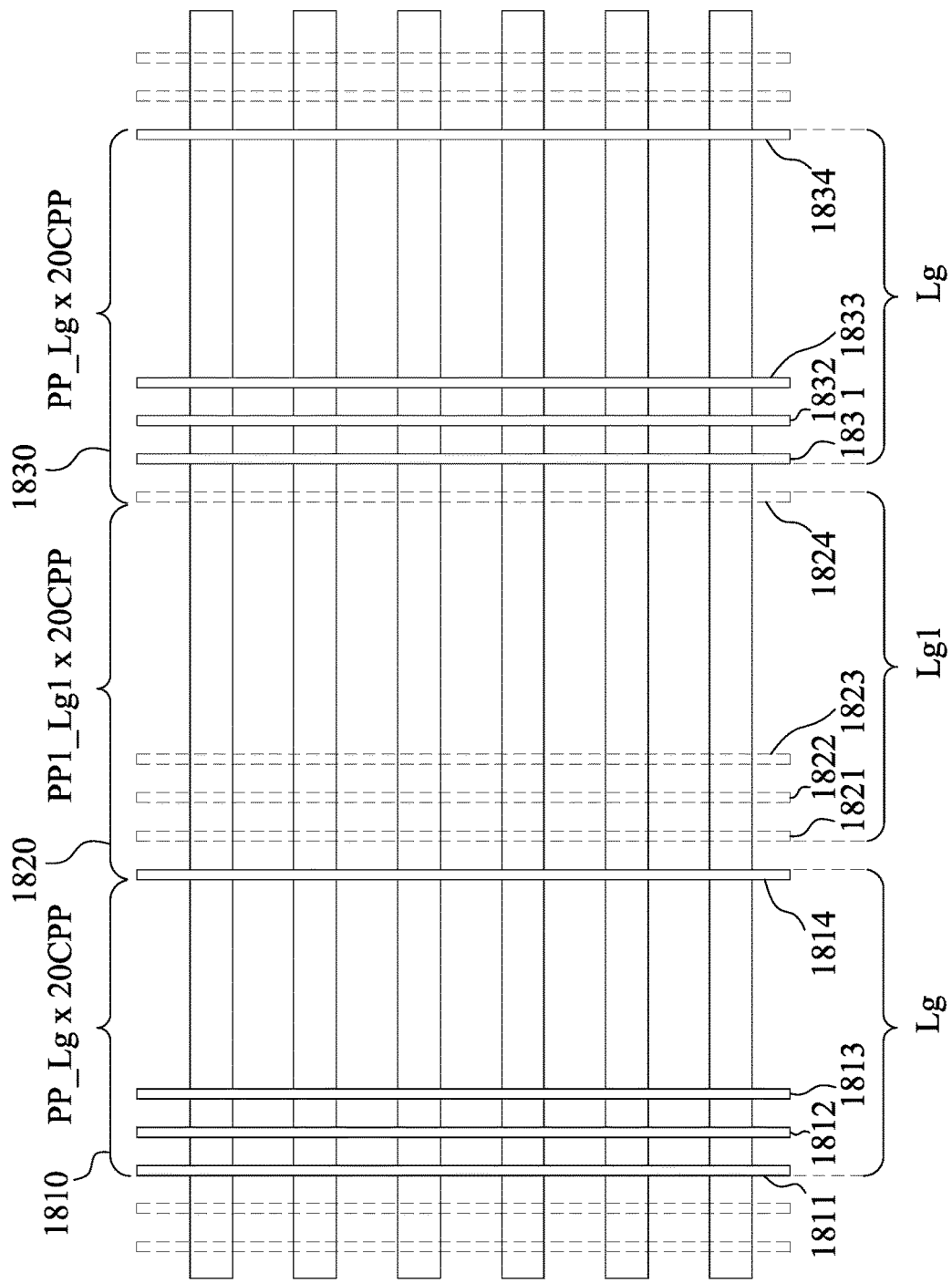
FIG. 18 is a schematic illustrating mixed poly pitch floorplan of 20CPP according to the exemplary embodiment.

FIG. 18 is a schematic illustrating mixed poly pitch floorplan of 20CPP according to the exemplary embodiment. According to some embodiments, a mixed poly pitch floorplan of 20 pitches can include PP_Lg×20CPP, PP1_Lg1×20CPP, and PP_Lg×20CPP. According to some embodiments, the minimum unit 1810 is a PP_Lg×20CPP, which includes 20 regular gates, for example: 1811, 1812, 1813 and 1814; the minimum unit 1820 is a PP1_Lg1×20CPP, which includes 20 extended gates with gate length Lg1, for example: 1821, 1822, 1823 and 1824; the minimum unit 1830 is another PP_Lg×20CCP, which includes 20 regular gates, for example: 1831, 1832, 1833, 1834. The 20CCP minimum units can be optimized for performance and for power, which will be discussed in FIGS. 19 and 20 below.

Figure 19:
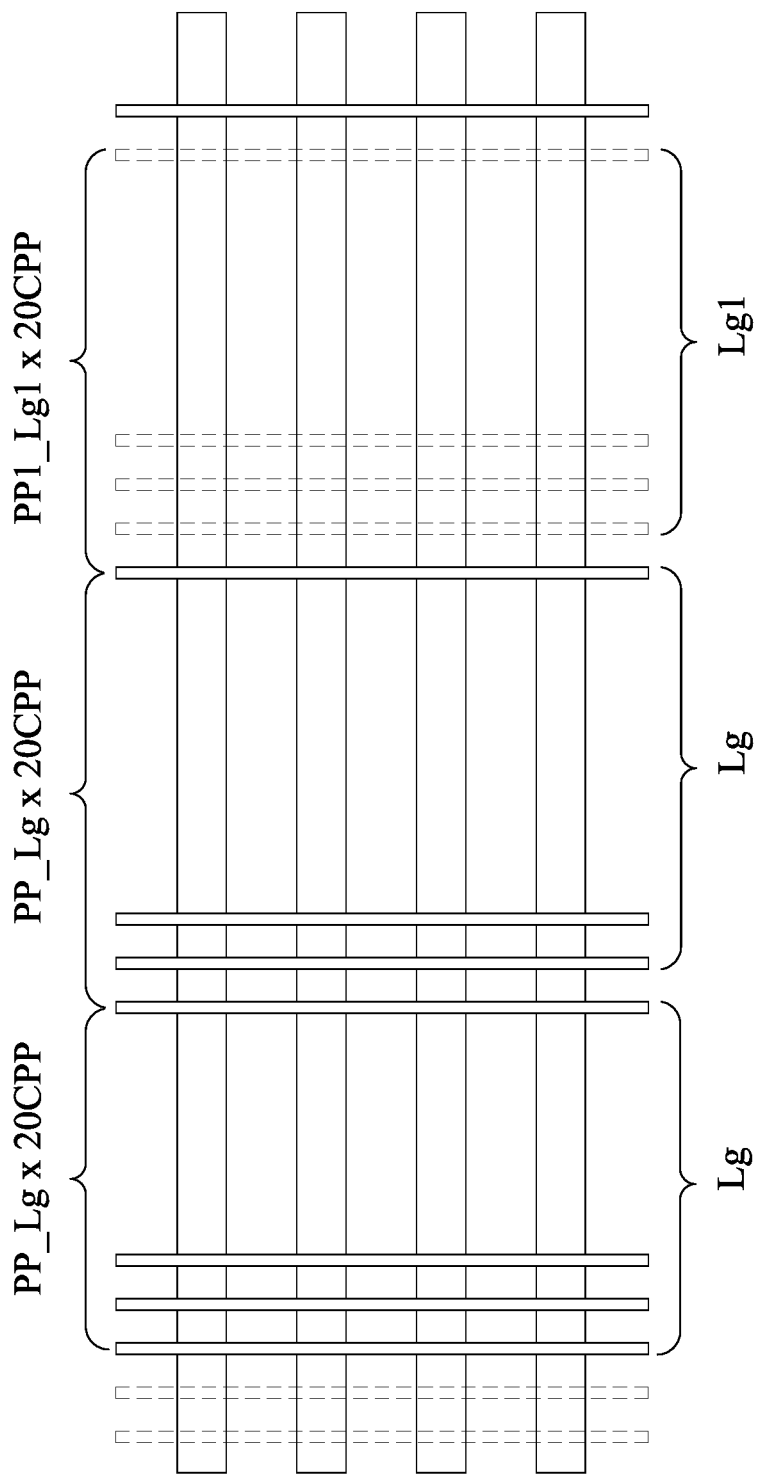
FIG. 19 is a schematic illustrating mixed poly pitch floorplan for performance of 20CPP according to the exemplary embodiment.

FIG. 19 is a schematic illustrating mixed poly pitch floorplan for performance of 20CPP according to the exemplary embodiment. As discussed above, regular gate length is faster than extended gate length but has a larger leakage power. Accordingly, the ratio of 20CPP minimum unit in FIG. 18 above can be optimized for power or for performance. The floorplan in FIG. 19 is optimized for performance because there are more regular gates.

Figure 20:
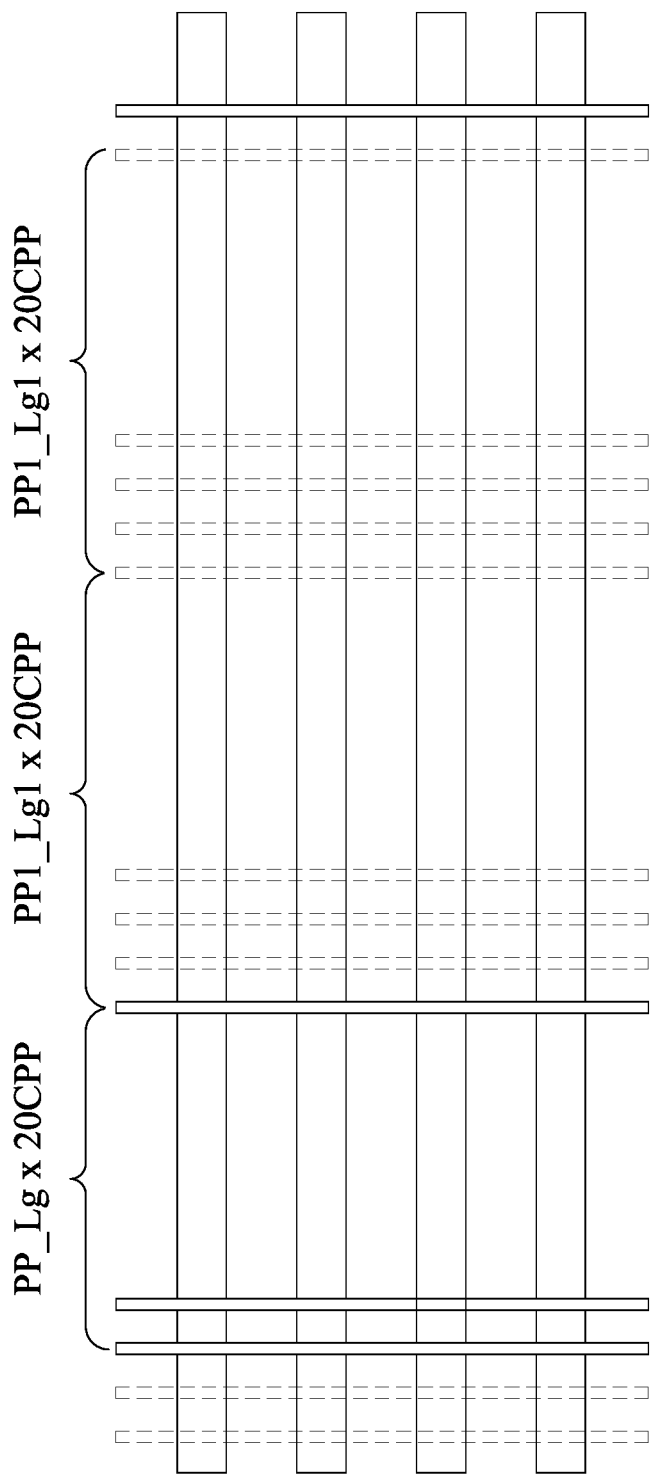
FIG. 20 is a schematic illustrating mixed poly pitch floorplan for power saving of 20CPP according to the exemplary embodiment.

In comparison, FIG. 20 is a schematic illustrating mixed poly pitch floorplan for power saving of 20CPP according to the exemplary embodiment. Instead of optimized for performance, FIG. 20 is optimized for power because there are more gates with extended gate length. As discussed above, the G-bias makes the leakage power smaller for gates with extended length.

Figure 21:
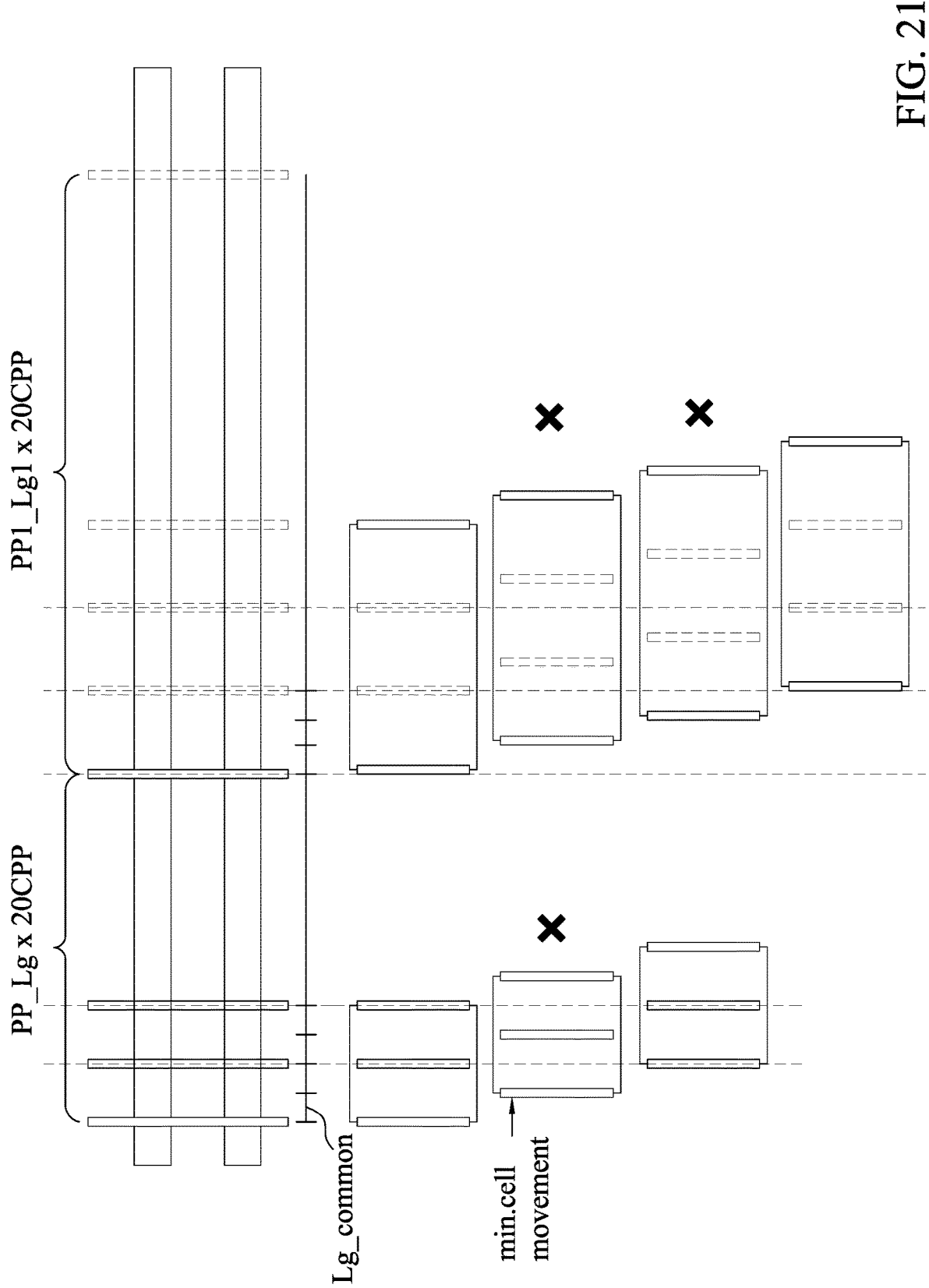
FIG. 21 is a schematic illustrating minimal cell movement in 20CPP floorplan according to the exemplary embodiment.

FIG. 21 is a schematic illustrating minimal cell movement in 20CPP floorplan according to the exemplary embodiment. According to some embodiments, the minimum cell movement within the minimum unit is the greatest common divisor (GCD) of the two different pitches, PP and PP1. This is also called the legalized step of the site. For example, when PP=45, and PP1=48, then the GCD of PP and PP1 is 3. Accordingly, the minimum cell movement is 3 and the legalized movement of the site is 3. For minimum units of both PP_Lg×20CPP and PP1_Lg1×20CPP, the minimum cell movement within the minimum units is 3. For example, for a cell PP_Lg, it can only move in steps of 3, after 15 steps, the cell PP_Lg moves the distance of one pitch 45; for a cell PP1_Lg1, it can also only move in steps of 3, after 16 steps, the cell PP1_Lg1 moves the distance of one pitch 48.

Figure 22:
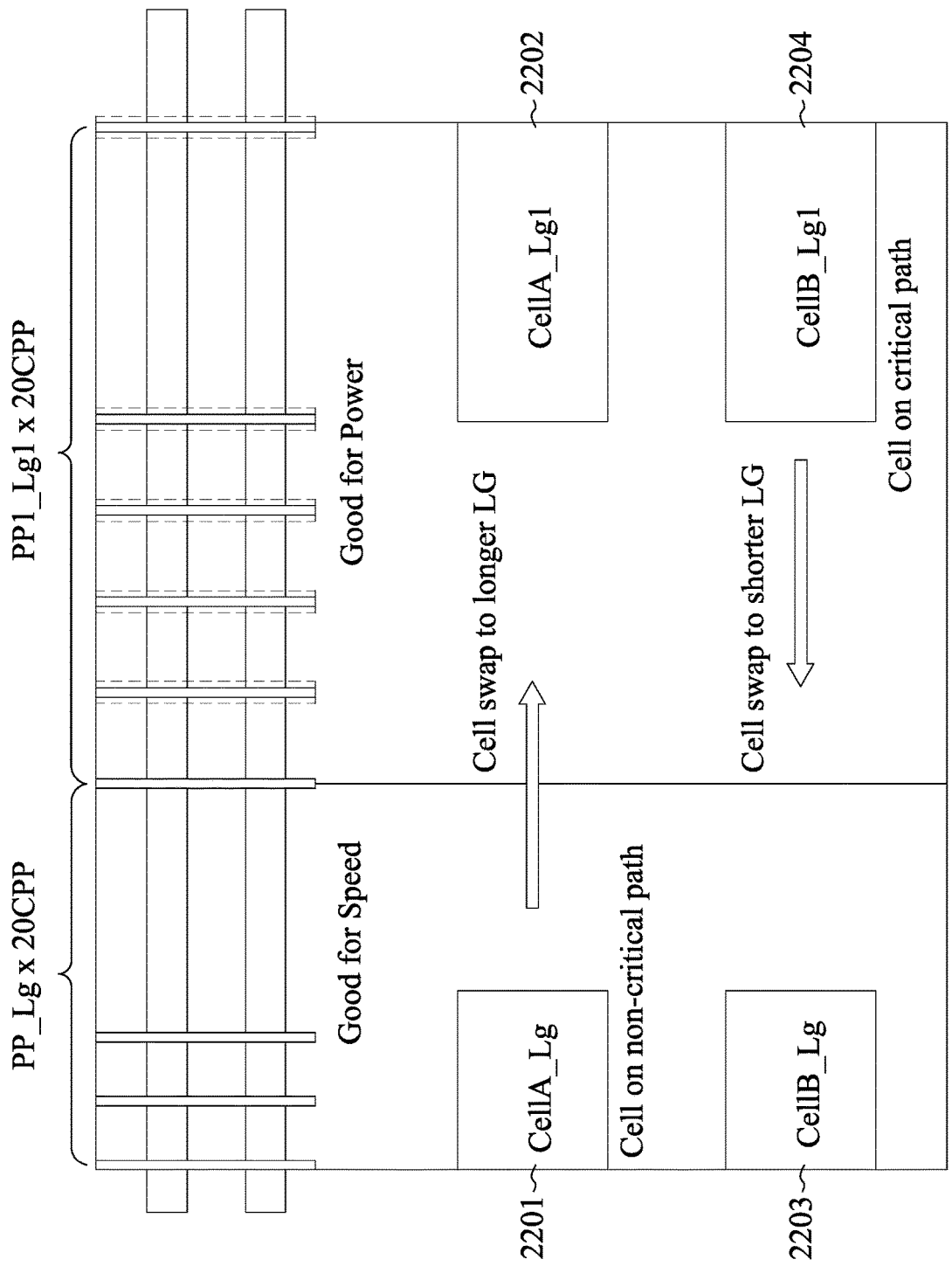
FIG. 22 is a schematic illustrating cell swapping according to an exemplary embodiment.

FIG. 22 is a schematic illustrating cell swapping according to an exemplary embodiment. According to some embodiments, the cell 2201 A_Lg with shorter gate length Lg, which is not on a critical path, can be swapped to the cell 2202 A_Lg 1 with longer gate length Lg1 for optimized lowered power. In comparison, the cell 2204 B_Lg1 with longer gate length is located on a critical path and it needs to be optimized for speed, so the cell 2204 B_Lg1 is swapped to the cell 2203 B_Lg with shorter gate length Lg for optimized speed. During the cell swapping either for power or for speed, the legalized step is a multiple of the minimum step 3, or 3*steps, as discussed above.

Figure 23:
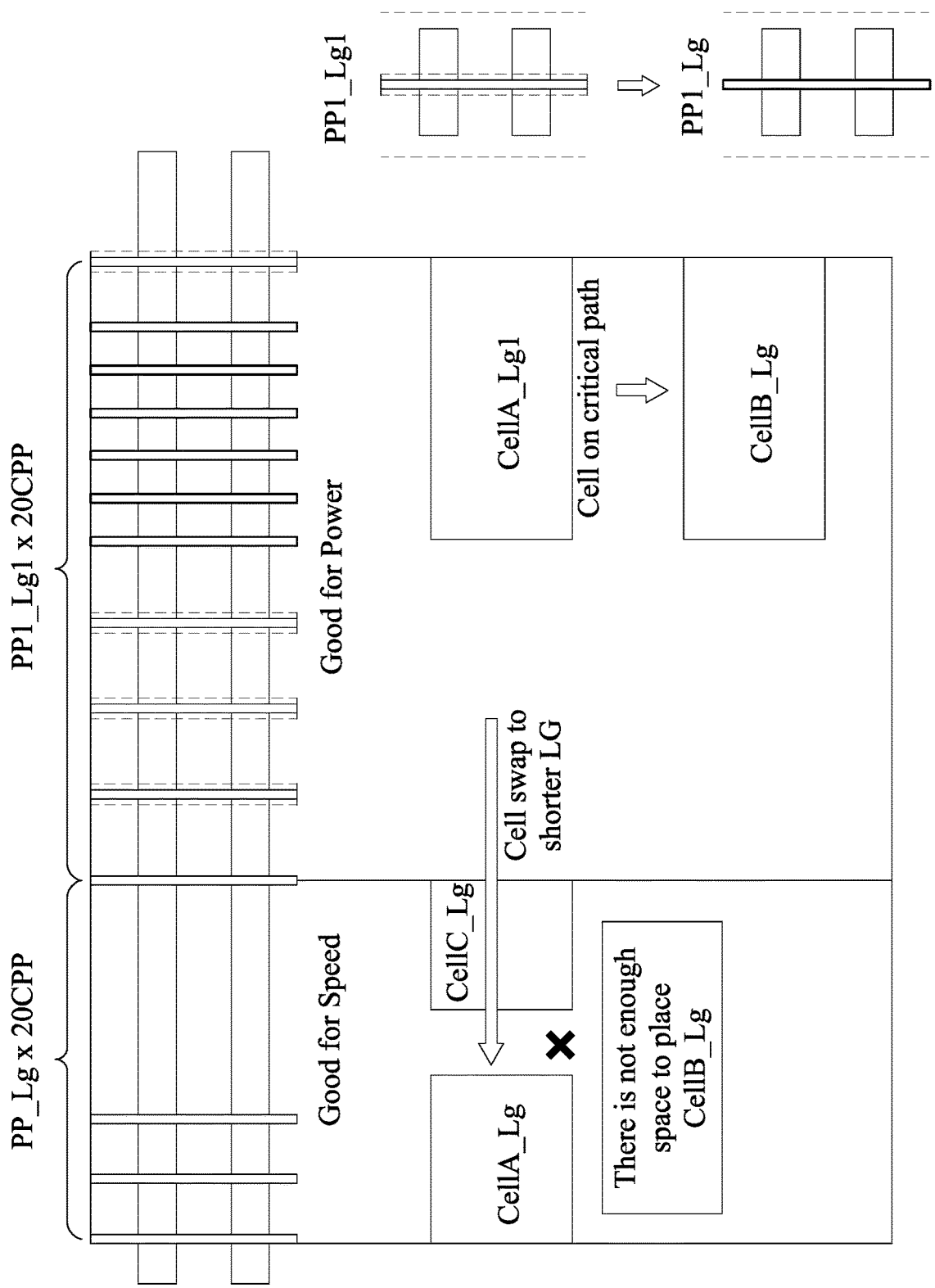
FIG. 23 is another schematic illustrating cell swapping according to the exemplary embodiment.

FIG. 23 is another schematic illustrating cell swapping according to the exemplary embodiment. In comparison to FIG. 22, cell B_Lg1 cannot be swapped to cell A_Lg because, for example, there is not enough space to accommodate cell B_Lg, or there is a mismatch in space configuration. Under this condition, according to some embodiments, cell B_Lg1 can be optimized without moving cell B_Lg1, instead, the gate length of cell B is modified to become B_Lg. According to G-bias discussed above, speed and/or power can be optimized through G-bias effect.

Figure 24:
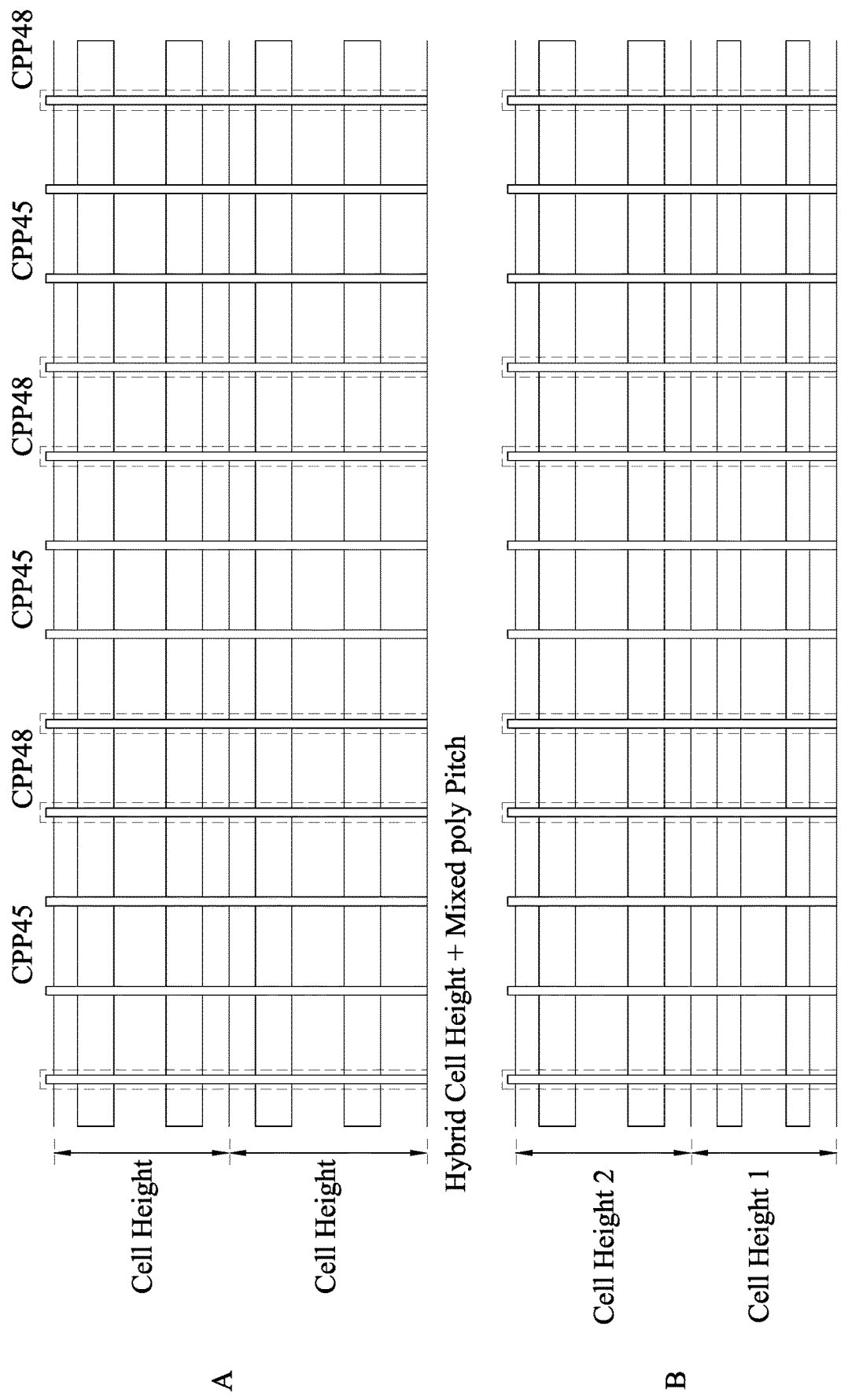
FIG. 24 is a schematic illustrating a single cell height with mixed poly pitch floorplan and a hybrid cell height with mixed poly pitch floorplan according to the exemplary embodiment.

FIG. 24 is a schematic illustrating a single cell height with mixed poly pitch floorplan and a hybrid cell height with mixed poly pitch floorplan according to the exemplary embodiment. In diagram of FIG. 24, a regular single cell height mixed poly pitch floorplan is illustrated. In comparison, in diagram B of FIG. 24, there are two difference cell heights: cell height 1 and cell height 2. Diagram B of FIG. 24 is hybrid cell height mixed poly pitch floor plan.

Figure 25:
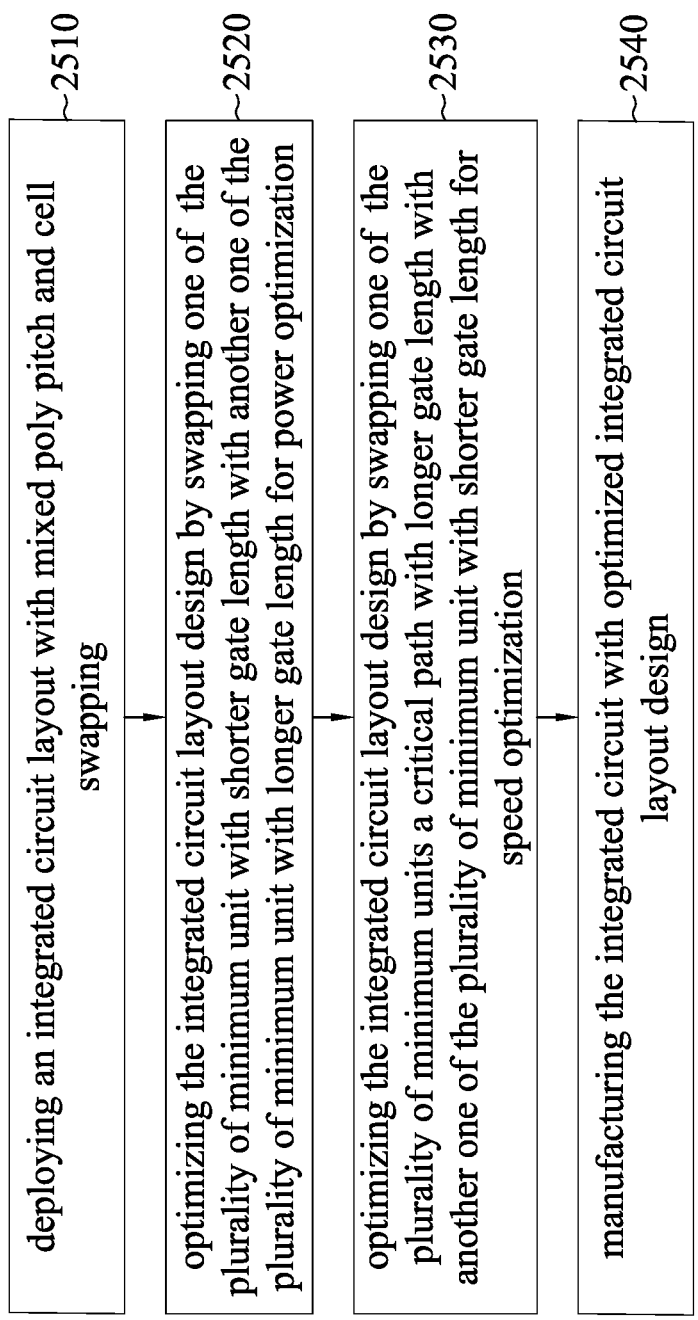
FIG. 25 is a flow chart illustrating a method of layout design with mixed poly pitch and cell swapping according to the exemplary embodiment.

FIG. 25 is a flow chart illustrating a method of layout design optimization using mixed poly pitch and cell swapping for manufacturing integrated circuit according to the exemplary embodiment. According to some embodiments, method of layout design optimization using mixed poly pitch and cell swapping for manufacturing integrated circuit includes the first step 2510 deploying an integrated circuit layout with mixed poly pitch and cell swapping, the integrated circuit layout includes a plurality of minimum units [2201-2204] each with at least a first number of first poly pitch cells with a first pitch size, and a second number of second poly pitch cells with a second pitch size, the first pitch size PP is different from the second pitch size PP1, the greatest common divisor of the first pitch size PP and the second pitch size PP1 is GCD, wherein GCD is an integer greater than 1; a gate length of the first pitch size is Lg; a gate length of the second pitch size is Lg1; Lg and Lg1 are capable of being extended to achieve G-bias for power and speed optimization of the minimum unit and the integrated circuit; and the size of the minimum unit is no smaller than the largest cell pitch size in a standard library. The method includes the next step 2520 optimizing the integrated circuit layout design by swapping one of the plurality of minimum unit with shorter gate length with another one of the plurality of minimum unis with longer gate length for power optimization. The method includes the next step 2530 optimizing the integrated circuit layout design by swapping one of the plurality of minimum units on a critical path with longer gate length with another one of the plurality of minimum unis with shorter gate length for speed optimization. The last step 2540 of the method is manufacturing the integrated circuit with the optimized integrated circuit layout deign.

Figure 26:
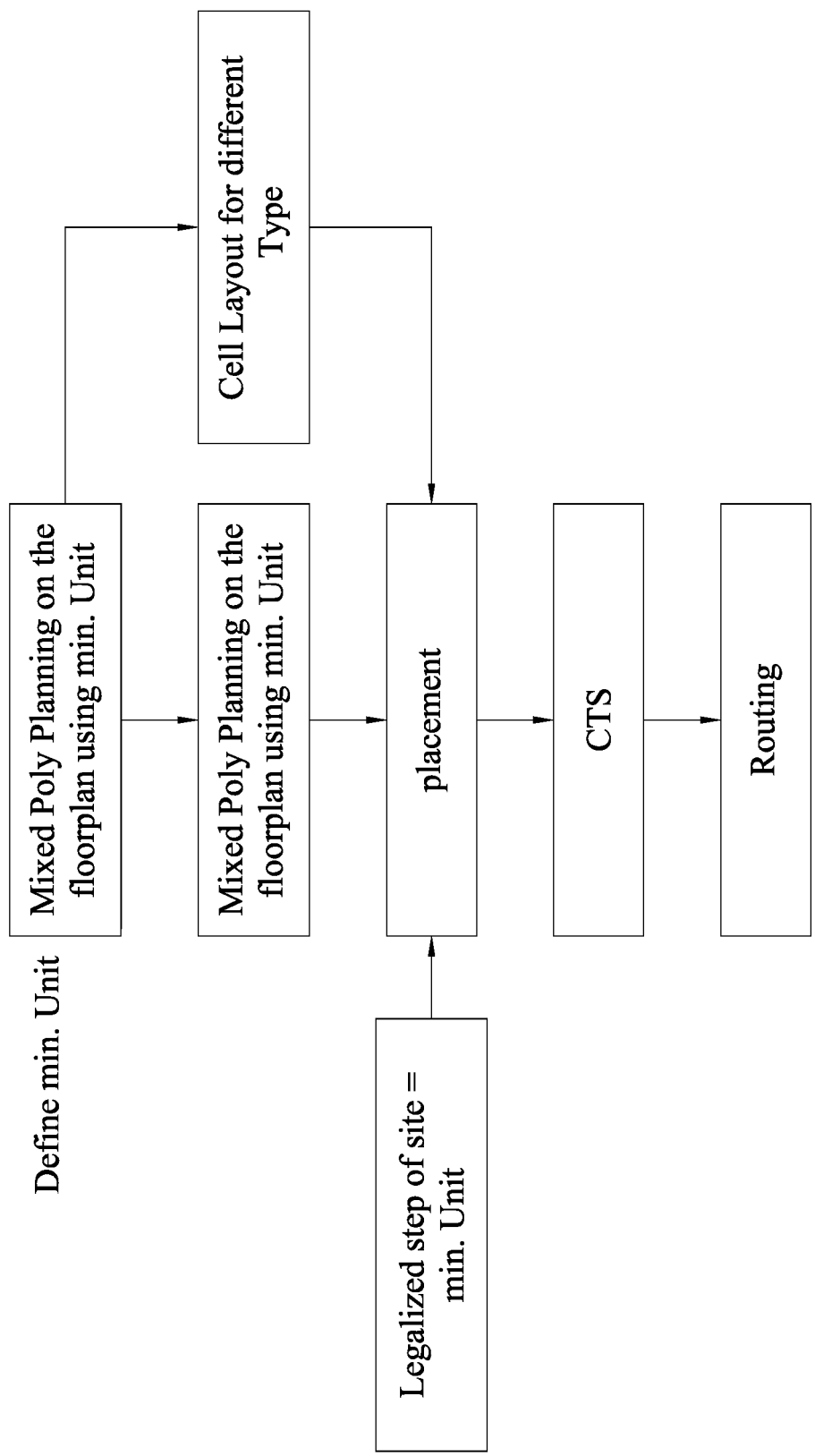
FIG. 26 is a flow chart illustrating a method of layout design optimization using mixed poly pitch cells for manufacturing integrated circuit according to the exemplary embodiment.

FIG. 26 is a flow chart illustrating a method of layout design optimization using mixed poly pitch cells for manufacturing integrated circuit according to the exemplary embodiment. According to some embodiments, referring to FIGS. 7-10, define the minimum unit as the CPP combination, for example: min.unit=combination (PP_Lg, PP1_Lg1||PP1_Lg1'). After the cell mixed poly pitch planning, the next step is mixed poly pitch planning in floorplan by using the min.unit defined above. For example, normal Lg is for high performance, and Lg+3 nm is implemented for leakage power reduction. Alternatively, cell layout for different types are planned. And the legalized step of site is equal to the min.unit. In the placement step, referring to FIGS. 11-15, cells are placed according to the results of planning steps. After the placement step, clock tree synthesis (CTS) is conducted. And signal routing step follows the CTS step.

Figure 27:
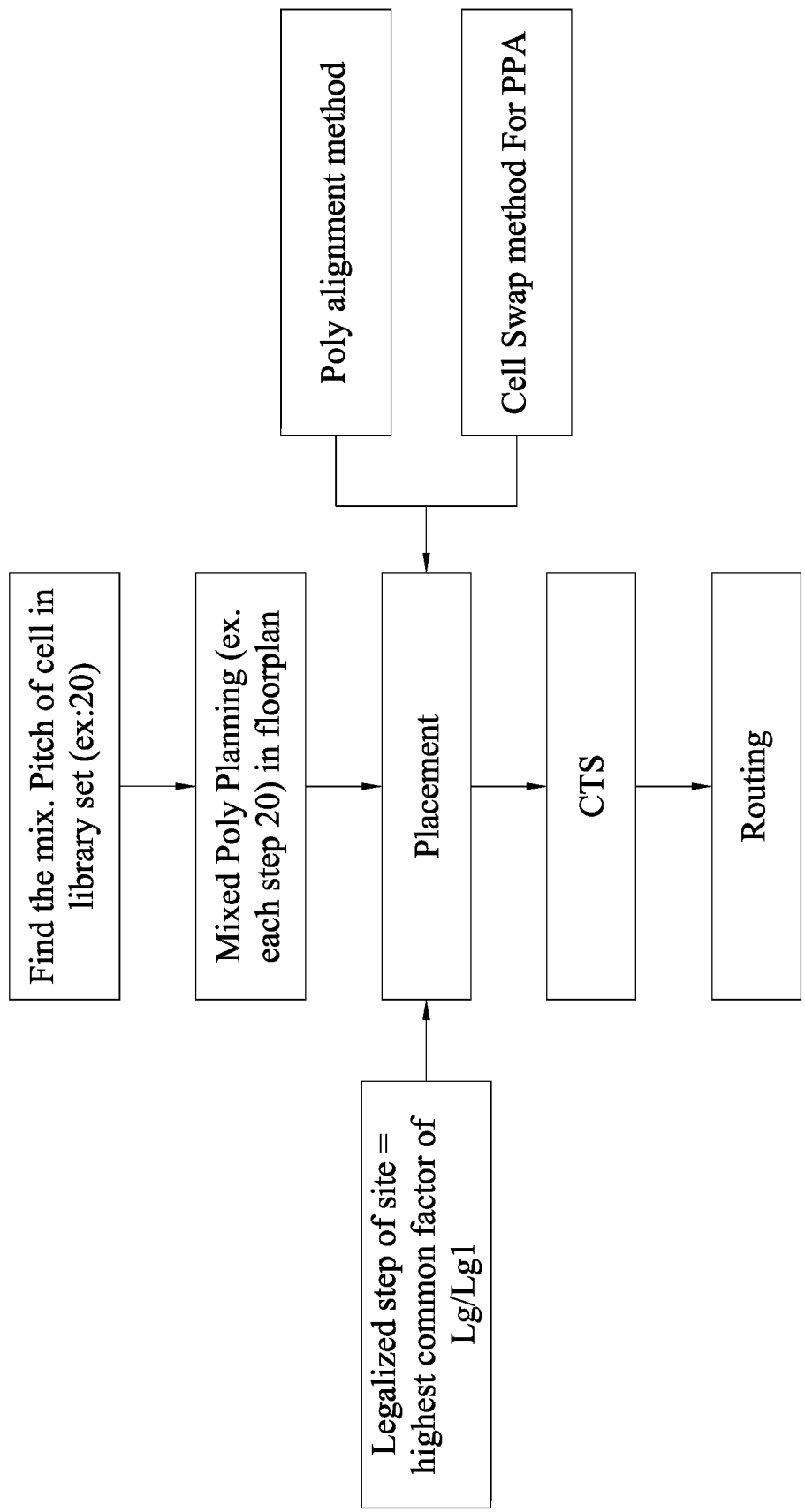
FIG. 27 is a flow chart illustrating a method of layout design with mixed poly pitch and cell swapping according to the exemplary embodiment.

FIG. 27 is a flow chart illustrating a method of layout design with mixed poly pitch and cell swapping, according to the exemplary embodiment. According to some embodiments, referring to FIGS. 17-24, the minim unit is the highest common factor. For example, find the max pitch of cells in the library as the min.unit. Refer to FIG. 17 and related discussions, for example, the min.unit is 20. Then use that min.unit (for example, 20) in the mixed poly planning. And the legalized step of site is the highest common factor of LG/Lg 1, referring to FIG. 18-20. Before the placement step, poly alignment and PPA cell swap are conducted, referring to FIGS. 21-24. Then, similar to FIG. 26, after the placement step, clock tree synthesis (CTS) is conducted. And signal routing step follows the CTS step.

Figure 28:
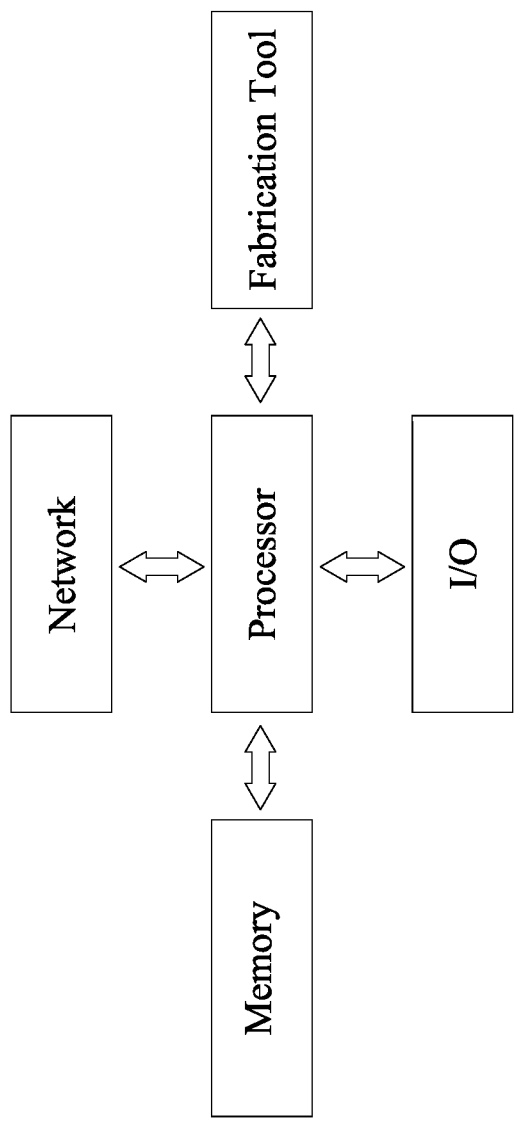
FIG. 28 is a system chart illustrating a layout design system according to the exemplary embodiment.

FIG. 28 is a system chart illustrating a layout design system according to the exemplary embodiment. According to some embodiments, a layout design system include at least a processor for processing all information related to design of floor plan and cell layout, etc. The layout design system also include at least a memory module for storing information related to design of floor plan and cell layout. The memory module can also be implemented to store software and tools for layout design and related tasks. According to some embodiments, the layout design system can include input and output modules, the layout design system can also be connected to network for information exchange. According to some embodiments, the layout design system can be connected to fabrication tools, after the layout design is finalized, the layout design is forwarded to the fabrication tool for fabrication of the integrated circuit according to the layout design.

According to an exemplary embodiment, an integrated circuit with mixed poly pitch cells with a plurality of different pitch sizes is disclosed. The integrated circuit includes: at least a minimum unit each with at least a first number of first poly pitch cells with a first pitch size, and a second number of second poly pitch cells with a second pitch size, the first pitch size PP is different from the second pitch size PP1, the greatest common divisor of the first pitch size PP and the second pitch size PP1 is GCD, wherein GCD is an integer greater than 1.

According to an exemplary embodiment, the plurality of different pitch sizes is 2. According to an exemplary embodiment, a gate length of the first pitch size is Lg; a gate length of the second pitch size is Lg1, the minimum unit includes 2 poly cells with the first pitch size PP and the first gate length Lg, and 2 poly cells with the second pitch size PP1 and the second gate length Lg1. According to an exemplary embodiment, the minimum unit includes 2 poly cells with the first pitch size PP and the first gate length Lg, one poly cell with the second pitch size PP1 and the first gate length Lg, and one poly cell with the second pitch size PP1 and the second gate length Lg1. According to an exemplary embodiment, the minimum unit includes 2 poly cells with the first pitch size PP and the first gate length Lg, one poly cell with the first pitch size PP and the first gate length Lg, and one poly cell with the second pitch size PP1 and the second gate length Lg1. According to an exemplary embodiment, the minimum unit includes 2 poly cells with the first pitch size PP and the first gate length Lg, one poly cell with the first pitch size PP and the first gate length Lg, and one poly cell with the second pitch size PP1 and the first gate length Lg. According to an exemplary embodiment, the first pitch size PP is 45 and the second pitch size PP1 is 48, the GCD is 3. According to an exemplary embodiment, the minimum unit includes 2 poly cells with the first pitch size PP and the first gate length Lg, and 3 poly cells with the second pitch size PP1 and the second gate length Lg1. According to an exemplary embodiment, the minimum unit includes 2 poly cells with the first pitch size PP and the first gate length Lg, and 2 poly cells with the second pitch size PP1 and the second gate length Lg1, and one poly cell with the first pitch size PP and the first gate length Lg. According to an exemplary embodiment, the minimum unit includes 2 poly cells with the first pitch size PP and the first gate length Lg, and 2 poly cells with the second pitch size PP1 and the first gate length Lg, and one poly cell with the second pitch size PP1 and the second gate length Lg1.

According to an exemplary embodiment, a method of integrated circuit layout design optimization using mixed poly pitch cells for manufacturing integrated circuit is disclosed. The method includes: deploying an integrated circuit layout with mixed poly pitch cells, the integrated circuit layout includes: a number of minimum unit each with at least a first number of first poly pitch cells with a first pitch size, and a second number of second poly pitch cells with a second pitch size, wherein both the first number and the second number are integers larger than 1; the first pitch size PP is different from the second pitch size PP1, the greatest common divisor of the first pitch size PP and the second pitch size PP1 is GCD, wherein GCD is an integer greater than 1; a gate length of the first pitch size is Lg; a gate length of the second pitch size is Lg1; the method further includes defining a plurality of equivalent cell types no greater than each of the number of minimum unit; optimizing the integrated circuit layout design by optimizing each of the minimum unit, optimizing each of the minimum unit further includes: selecting one of the plurality of the equivalent cell types with a pitch size combination and a gate length combination which optimizes a speed and a total power of the integrated circuit. the last step of the method is manufacturing the integrated circuit with the optimized integrated circuit layout deign.

According to an exemplary embodiment, the method further includes: optimizing the integrated circuit layout design by optimizing each of the minimum unit one more time until the speed and the total power reach predetermined values. According to an exemplary embodiment, the method further includes: optimizing the integrated circuit layout design by optimizing each of the minimum unit a predetermined number of iterations.

According to an exemplary embodiment, an integrated circuit layout with mixed poly pitch cells with a plurality of different pitch sizes is disclosed. The integrated circuit layout includes: a plurality of minimum units each with at least a first number of first poly pitch cells with a first pitch size, and a second number of second poly pitch cells with a second pitch size, the first pitch size PP is different from the second pitch size PP1, a gate length of the first pitch size is Lg; a gate length of the second pitch size is Lg 1; the layout is formed based on a modification of an initial layout, wherein the modification comprises increasing a length of one of Lg and Lg1 by a gate parameter modification magnitude selected to achieve G-bias of the minimum unit. According to an exemplary embodiment, the size of the minimum unit is no smaller than the largest cell pitch size in a standard library. According to an exemplary embodiment, the size of the minimum unit is no smaller than the size of a flip-flop with reset function in the standard library. According to an exemplary embodiment, the size of the minimum unit is greater than 13. According to an exemplary embodiment, the size of the minimum unit is 20. According to an exemplary embodiment, one of the plurality of minimum units with shorter gate length is swapped with another one of the plurality of minimum unis with longer gate length for power optimization. According to an exemplary embodiment, one of the plurality of minimum units on a critical path with longer gate length is swapped with another one of the plurality of minimum unis with shorter gate length for speed optimization.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   deploying a layout, wherein the layout comprises a unit including a plurality of gates;
   defining a plurality of cell types based on the unit;
   optimizing the layout by:
      selecting one of the cell types with a pitch size combination and a gate length combination which optimizes at least one of a speed and a power of the layout; and
   manufacturing a circuit with the optimized layout.

2. The method of claim 1, further comprising optimizing the unit until the at least one of the speed and the power reaches a predetermined value.

3. The method of claim 1, further comprising optimizing the unit a predetermined number of iterations.

4. The method of claim 1, wherein the unit comprises:
   a plurality of first gates having a first pitch size; and
   a plurality of second gates having a second pitch size, wherein a number of the first gates is less than or equal to a number of the second gates and the first pitch size is less than the second pitch size.

5. The method of claim 1, wherein the second gates have substantially the same gate length as the first gates.

6. The method of claim 1, wherein the first and second gates have different gate lengths.

7. The method of claim 1, wherein the number of the first gates is equal to the number of the second gates, the first gates has a first gate length, and the second gates has a second gate length greater than the first gate length.

8. The method of claim 1, wherein the number of first gates is less than the number of the second gates, the first gates has a first gate length, and the second gates has a second gate length greater than the first gate length.

9. The method of claim 1, wherein the first gates has a first gate length, one of the second gates has the first gate length, and one of the second gates has a second gate length greater than the first gate length.

10. The method of claim 1, further comprising a plurality of third gates having the first pitch size, wherein the second gates are between the first and third gates.

11. The method of claim 10, wherein a number of the third gates is equal to the number of the first gates.

12. The method of claim 10, wherein the third gates has substantially the same gate length as the first gates.

13. The method of claim 10, wherein the third gate has a smaller gate length than the second gates.

14. A method comprising:
   defining a plurality of cell types based on a layout, wherein the layout comprises a plurality of first gates having a first pitch size and a plurality of second gates having a second pitch size greater than the first pitch size; and
   optimizing the layout by:
      selecting one of the cell types with a pitch size combination and a gate length combination which optimizes at least one of a speed and a power of the layout.

15. The method of claim 14, wherein one of the first gates has a first gate length, and one of the second gates has a second gate length greater than the first gate length.

16. The method of claim 15, wherein one of the second gates has the first gate length.

17. The method of claim 15, wherein the layout further include a plurality of third gates having the first gate length, wherein the second gates are between the first and third gates.

18. The method of claim 17, wherein a number of the third gates is equal to a number of the first gates.

19. The method of claim 17, wherein the third gates has substantially the same gate length as the first gate.

20. A method comprising:
   defining a plurality of cell types based on a layout, wherein the layout comprises a plurality of first gates and a plurality of second gates, one of the first gates has a first gate length, and one of the second gates has a second gate length greater than the first gate length; and
   optimizing the layout by:
      selecting one of the cell types with a pitch size combination and a gate length combination which optimizes at least one of a speed and a power of the layout.

* * * * *